(12) United States Patent
Hartenstine et al.

(10) Patent No.: US 12,508,960 B2
(45) Date of Patent: Dec. 30, 2025

(54) SLIDE OUT CHILD VEHICLE SEAT SYSTEM

(71) Applicant: WONDERLAND SWITZERLAND AG, Steinhausen (CH)

(72) Inventors: Curtis M. Hartenstine, Birdsboro, PA (US); Andrew J. Taylor, Mohnton, PA (US); Joshua Ferguson, Southampton, PA (US); Patrick J. G. Bowers, West Chester, PA (US); David A. Lehman, Lancaster, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/463,838

(22) Filed: Sep. 8, 2023

(65) Prior Publication Data

US 2024/0208377 A1    Jun. 27, 2024

Related U.S. Application Data

(60) Provisional application No. 63/434,754, filed on Dec. 22, 2022.

(51) Int. Cl.
*B60N 2/28* (2006.01)
*B60N 2/06* (2006.01)

(52) U.S. Cl.
CPC ........... *B60N 2/2869* (2013.01); *B60N 2/062* (2013.01); *B60N 2/2821* (2013.01)

(58) Field of Classification Search
CPC ..... B60N 2/2869; B60N 2/062; B60N 2/2821
See application file for complete search history.

(56) References Cited

U.S. PATENT DOCUMENTS

| | | | |
|---|---|---|---|
| 6,241,314 B1 | 6/2001 | Pufall | |
| 6,283,545 B1* | 9/2001 | Ernst | B60N 2/2845 297/256.16 |
| 6,428,099 B1 | 8/2002 | Kain | |
| 6,793,283 B1 | 9/2004 | Sipos | |
| 7,891,721 B2 | 2/2011 | Pesach | |
| 8,033,605 B2* | 10/2011 | Miura | B60N 2/2893 297/344.14 |
| 8,702,169 B2* | 4/2014 | Abadilla | B60N 2/2869 297/256.16 |

(Continued)

FOREIGN PATENT DOCUMENTS

| | | |
|---|---|---|
| CN | 116373706 A | 7/2023 |
| DE | 102017203726 A1 | 9/2017 |

(Continued)

OTHER PUBLICATIONS

PCT Invitation to Pay Additional Fees and, Where Applicable, Protest Fee; International Application No. PCT/US2023/026239; International Filing Date: Jun. 26, 2023; Date of Mailing: Aug. 21, 2023; pp. 1-3.

(Continued)

*Primary Examiner* — Philip F Gabler
(74) *Attorney, Agent, or Firm* — CANTOR COLBURN LLP

(57) ABSTRACT

Child restraint systems are provided position positioning systems and assemblies to provide relative movement between a support base and a child seat such that the child seat is rotatable and translatable relative to the support base.

20 Claims, 19 Drawing Sheets

(56) References Cited

U.S. PATENT DOCUMENTS

| | | | |
|---|---|---|---|
| 9,969,304 B2* | 5/2018 | Johnson | B60N 2/2869 |
| 10,449,876 B2* | 10/2019 | Lonstein | B60N 2/2875 |
| 10,640,020 B2* | 5/2020 | Jung | B60N 2/2875 |
| 10,688,892 B2 | 6/2020 | Anderson et al. | |
| 11,370,334 B2 | 6/2022 | Mo | |
| 2004/0178669 A1* | 9/2004 | Lady | B60N 2/2869 297/250.1 |
| 2008/0136232 A1 | 6/2008 | Hutchinson et al. | |
| 2008/0252122 A1 | 10/2008 | Vallentin | |
| 2009/0026819 A1* | 1/2009 | Zahar | B60N 2/2821 297/256.16 |
| 2011/0109137 A1 | 5/2011 | Yamaguchi et al. | |
| 2011/0298257 A1 | 12/2011 | Abadilla et al. | |
| 2016/0325644 A1 | 11/2016 | Miller | |
| 2017/0182914 A1 | 6/2017 | Lonstein et al. | |
| 2018/0264977 A1 | 9/2018 | Anderson et al. | |
| 2019/0077282 A1 | 3/2019 | Reaves et al. | |
| 2020/0391627 A1 | 12/2020 | Williams | |
| 2022/0105836 A1 | 4/2022 | Messner et al. | |
| 2022/0332225 A1* | 10/2022 | Hutchinson | B60N 2/286 |

FOREIGN PATENT DOCUMENTS

| | | |
|---|---|---|
| EP | 3950420 A1 | 2/2022 |
| GB | 2288328 A | 10/1995 |
| GB | 2607055 A | 11/2022 |
| KR | 101689710 B1 | 12/2016 |

OTHER PUBLICATIONS

International Search Report and Written Opinion for International Application No. PCT/US2023/26239; International Filing Date Jun. 26, 2023; Report Mail Date Nov. 2, 2023 (22 Pages).

Extended European Search Report for European Application No. 23196395.0; Report Mail Date Feb. 16, 2024 (9 Pages).

German Search Report for German Application No. 102023124333.0; Report Mail Date May 2, 2024 (12 Pages—with English Translation).

PCT Invitation to Pay Additional Fees; International Application No. PCT/US2024/059928; International Filing Date: Dec. 13, 2024; Mailed Feb. 13, 2025; pp. 1-2.

EP Third Party Submission, Communication pursuant to Rule 114(2) EPC; Application No. 23196395.0; Issued Apr. 14, 2025; pp. 1-4.

International Search Report and Written Opinion for International Application No. PCT/US2024/059928; International Filing Date Dec. 13, 2024; Report Mail Date: Apr. 17, 2025 (25 Pages).

PCT International Preliminary Report on Patentability; International Application No. PCT/US2023/026239; International Filing Date: Jun. 26, 2023; Date Mailed: Jun. 24, 2025; pp. 1-16.

* cited by examiner

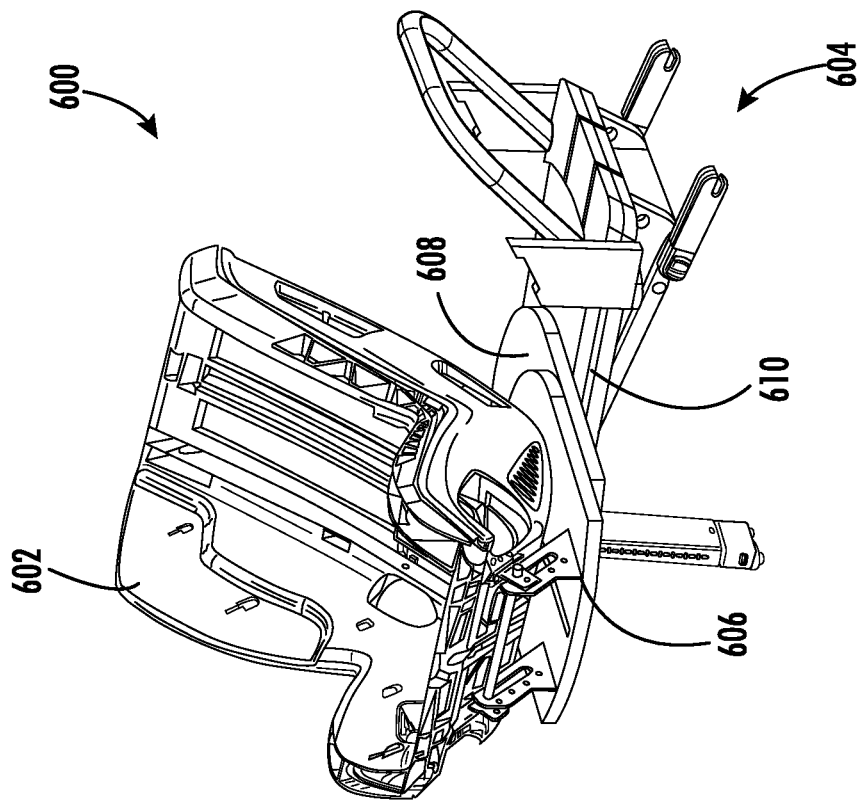
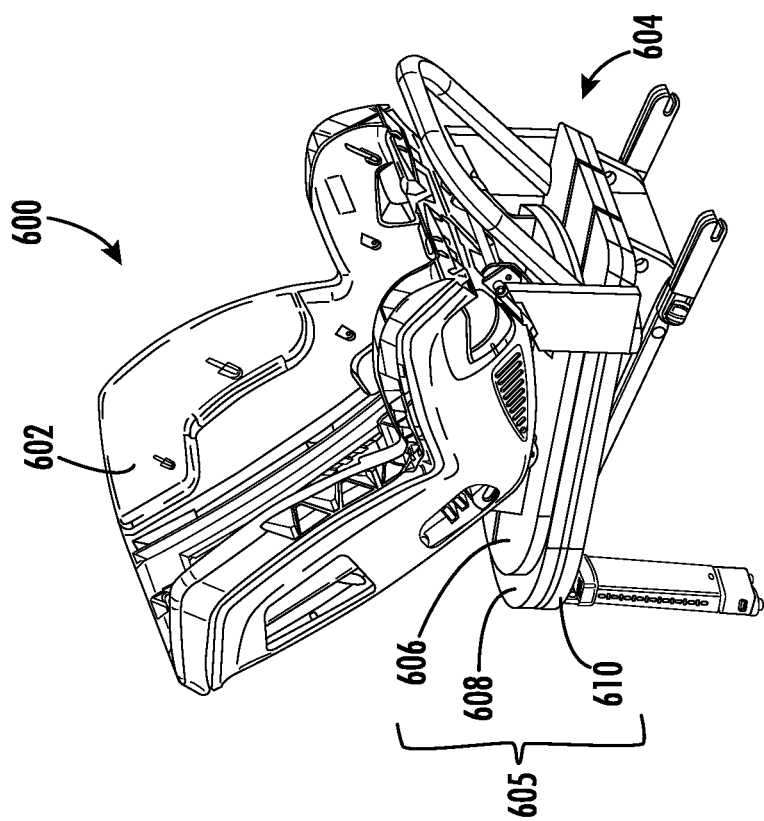
FIG. 6B
FIG. 6A

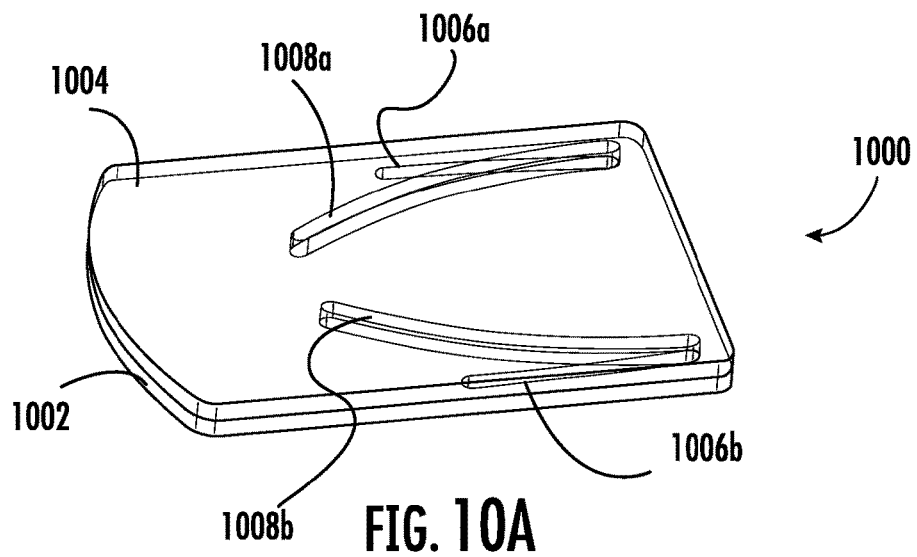
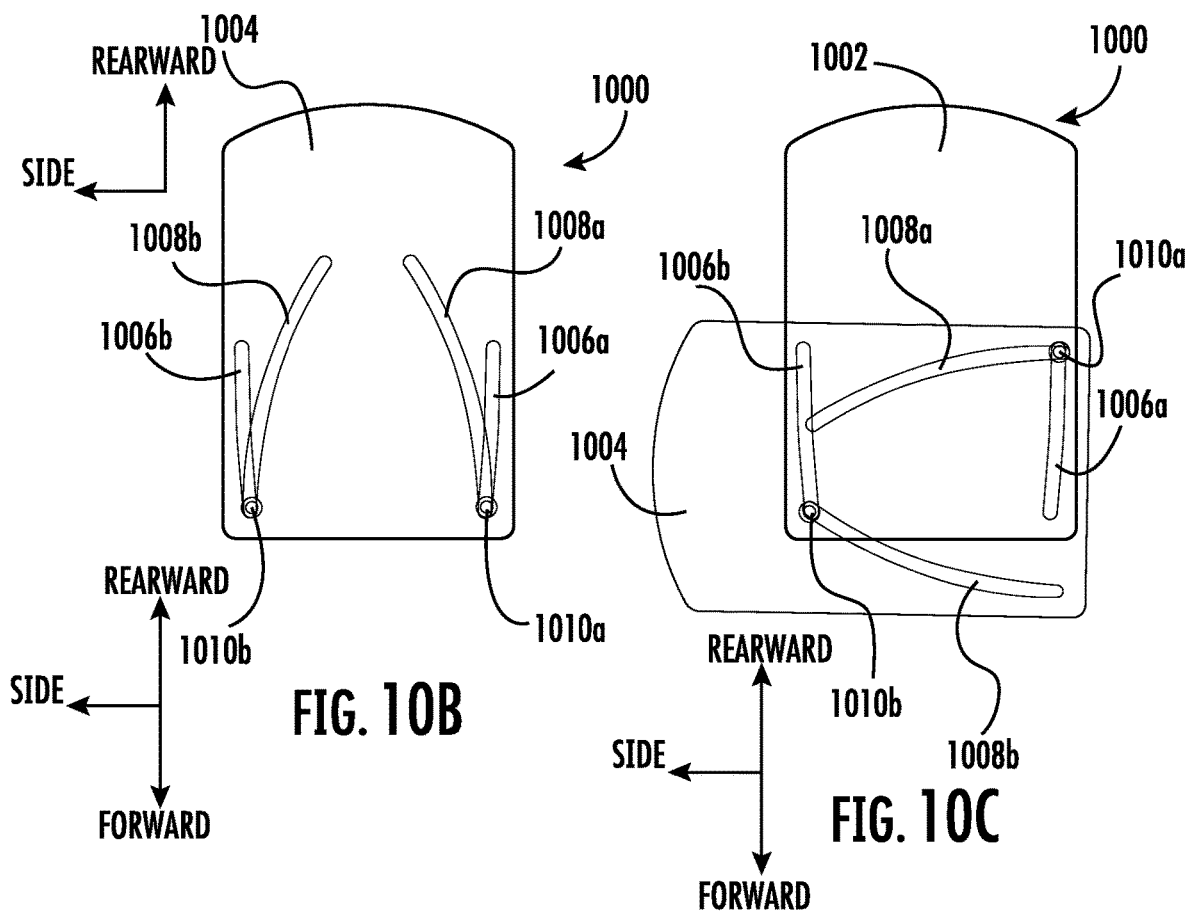

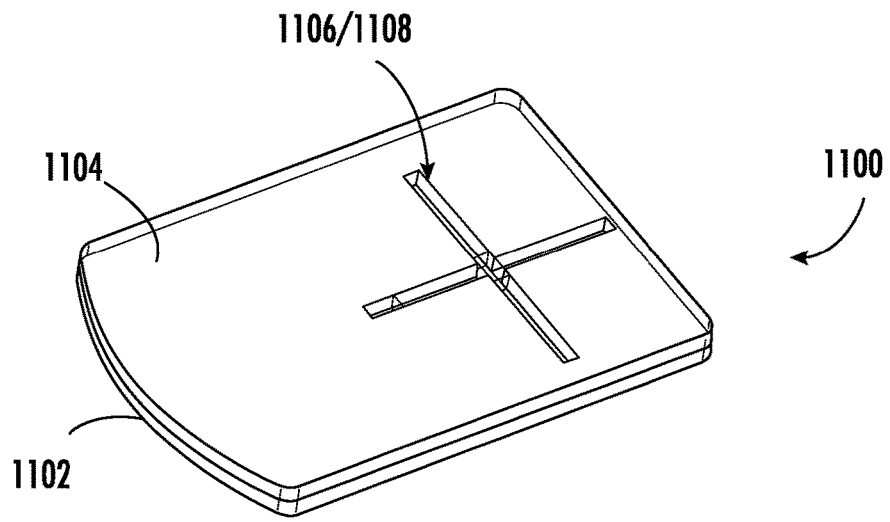
FIG. 11A
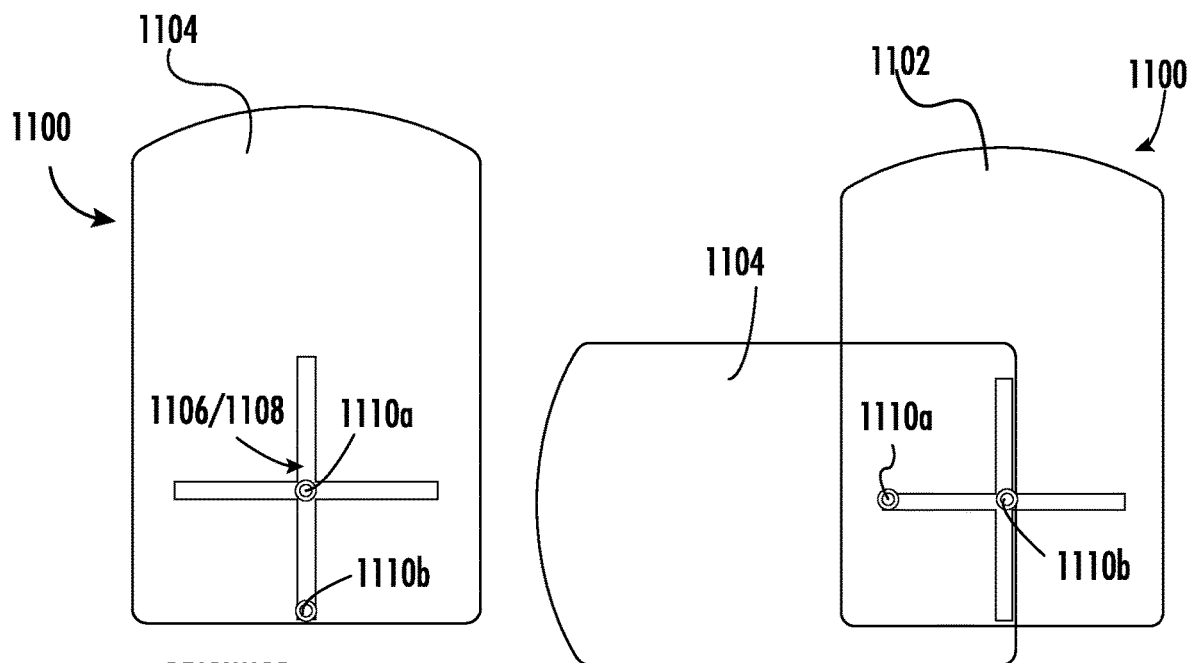
FIG. 11B
FIG. 11C

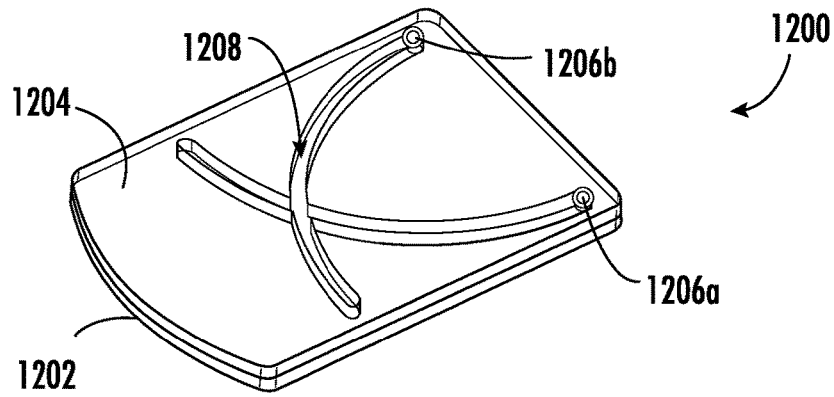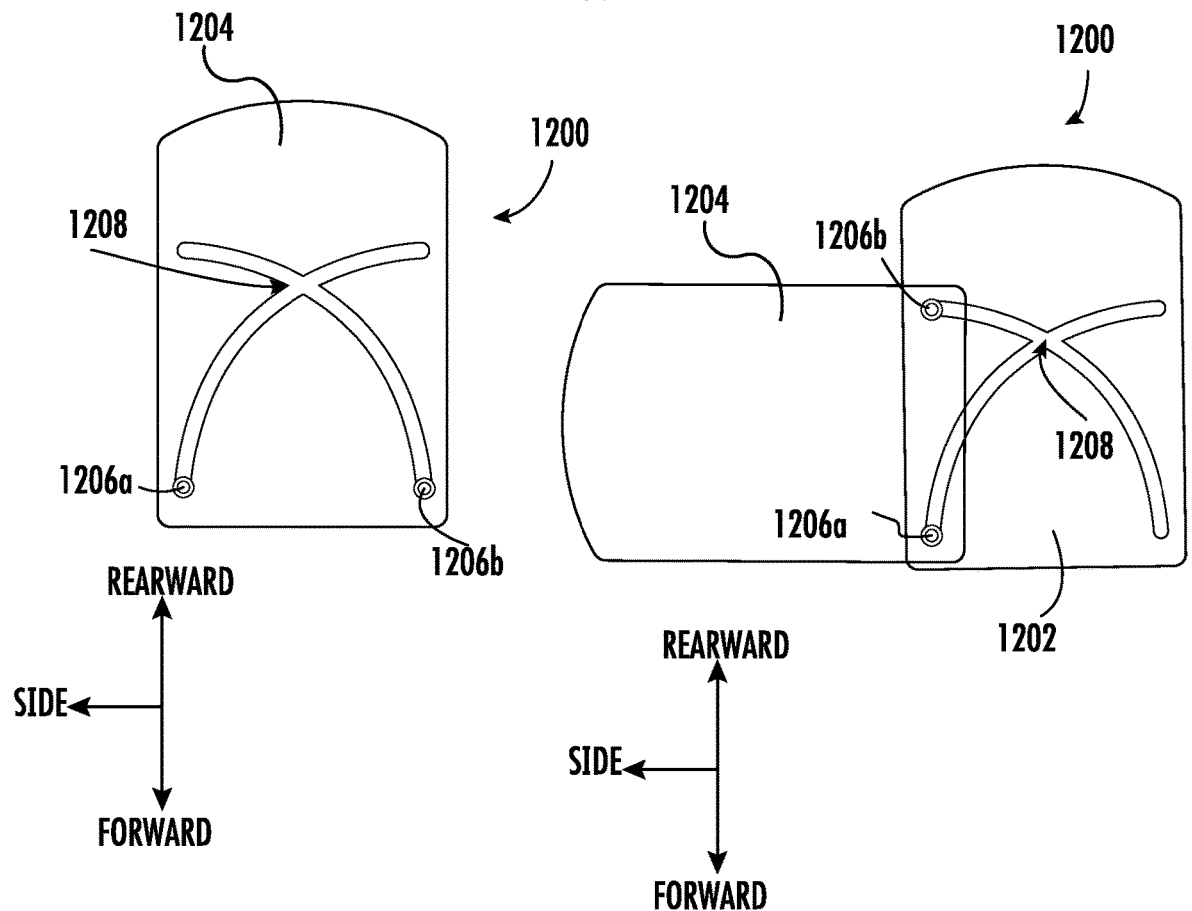
FIG. 12A
FIG. 12B
FIG. 12C

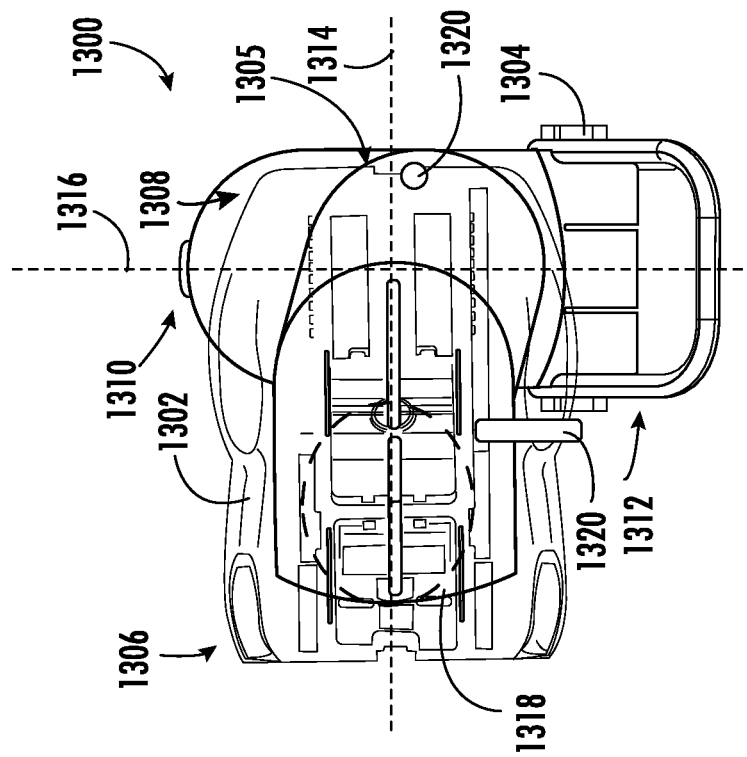
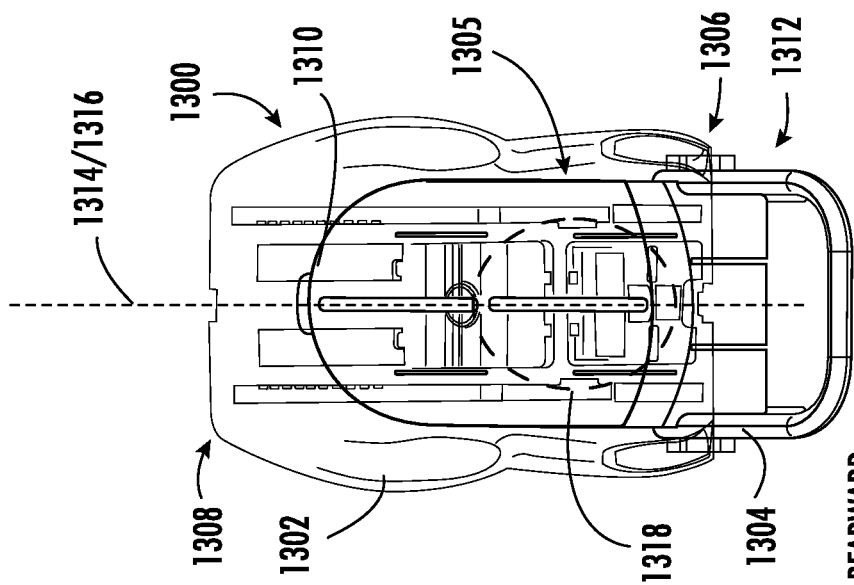
FIG. 13D
FIG. 13C

SLIDE OUT CHILD VEHICLE SEAT SYSTEM

CROSS REFERENCE TO RELATED APPLICATIONS

This application claims the benefit of U.S. Provisional Application No. 63/434,754, filed on Dec. 22, 2022, which is incorporated herein by reference in its entirety.

FIELD

Embodiments of the present disclosure relate to the art of child restraint systems for use in a vehicle, and more particularly to a support base of a child restraint system.

BACKGROUND

A child restraint system is designed to protect a child from injury or death during a collision of a vehicle. Existing child restraint systems commonly include a base portion and a seat portion detachably installed on the base portion. When a child restraint system is secured on a vehicle by a lower anchor and/or a vehicle belt, the base portion must be adjusted to a proper reclined angle. In addition, depending on the type of seat that is being used, the seat may be position either in a forward-facing or a rearward-facing orientation (e.g., relative to a front of the vehicle). Existing base portions cannot support different types of seats in different orientations and at various angles of recline.

BRIEF DESCRIPTION

According to some embodiments, child restraint systems include a support base configured to support a child seat thereon. The support base includes a first positioning element configured couple to the child seat, a second positioning element arranged relative to the first positioning element, wherein the first positioning element is moveably connected to the second positioning element in a translating manner, and a third positioning element arranged relative to the second positioning element, wherein the second positioning element is movably connected to the third positioning element in a rotating manner. The second positioning element is arranged between the first positioning element and the third positioning element.

In addition to one or more of the features described herein, or as an alternative, further embodiments of the child restraint systems may include that the child seat is releasably couplable to at least a portion of the support base.

In addition to one or more of the features described herein, or as an alternative, further embodiments of the child restraint systems may include that the child seat if fixedly attached to at least a portion of the support base.

In addition to one or more of the features described herein, or as an alternative, further embodiments of the child restraint systems may include one or more recline structures coupled to the first positioning element on a side opposite from the second positioning element, wherein the child seat is coupled to the one or more recline structures.

In addition to one or more of the features described herein, or as an alternative, further embodiments of the child restraint systems may include that the child seat is releasably coupled to the one or more recline structures.

In addition to one or more of the features described herein, or as an alternative, further embodiments of the child restraint systems may include that the one or more recline structures are configured to allow the child seat to change an angle of inclination relative to the support base.

In addition to one or more of the features described herein, or as an alternative, further embodiments of the child restraint systems may include a securing mechanism operably coupled to the third positioning element on a side opposite the second positioning element.

In addition to one or more of the features described herein, or as an alternative, further embodiments of the child restraint systems may include a load leg operably coupled to the third positioning element on a side opposite the second positioning element.

In addition to one or more of the features described herein, or as an alternative, further embodiments of the child restraint systems may include a rebound bar operably coupled to the third positioning element.

In addition to one or more of the features described herein, or as an alternative, further embodiments of the child restraint systems may include at least one locking mechanism configured releasably fix a relative movement between at least two of the first positioning element, the second positioning element, and the third positioning element.

According to some embodiments, child restraint systems include a support base configured to support a child seat thereon, a first positioning element configured to couple to the child seat, and a second positioning element rotatably coupled to the support base about a first pivot axis and coupled to the first positioning element about a second pivot axis, wherein the first pivot axis is parallel to the second pivot axis.

In addition to one or more of the features described herein, or as an alternative, further embodiments of the child restraint systems may include that the first pivot axis is fixed in position relative to the first positioning element and the second positioning element.

In addition to one or more of the features described herein, or as an alternative, further embodiments of the child restraint systems may include that the second pivot axis is fixed in position relative to the first positioning element and the second positioning element and movable relative to the support base.

In addition to one or more of the features described herein, or as an alternative, further embodiments of the child restraint systems may include that the child seat is releasably coupled to the first positioning element.

In addition to one or more of the features described herein, or as an alternative, further embodiments of the child restraint systems may include one or more recline structure arranged between the first positioning element and the child seat, the child seat being supported on the one or more recline structures.

In addition to one or more of the features described herein, or as an alternative, further embodiments of the child restraint systems may include that the child seat is releasably supported on the one or more recline structures.

In addition to one or more of the features described herein, or as an alternative, further embodiments of the child restraint systems may include at least one of a securing mechanism configured to releasably secure the support base to a vehicle seat, a load leg configured to support the support base relative to a vehicle floor, and a rebound bar configured to contact a seat back of a vehicle seat.

In addition to one or more of the features described herein, or as an alternative, further embodiments of the child restraint systems may include that the first pivot axis and the second pivot axis are not coincident.

According to some embodiments, child restraint systems include a child seat having a seat axis and a support base having a base axis. The child seat is movably mounted to the support base, the child seat is rotatably movable relative to the support base and slidingly movable relative to the support base, and the child seat is transitionable between a travel position and a loading position, wherein the seat axis and the base axis are parallel in the travel position and the seat axis, and the base axis are non-parallel in the loading position.

In addition to one or more of the features described herein, or as an alternative, further embodiments of the child restraint systems may include that the seat axis and the base axis are normal to each other in the loading position.

In addition to one or more of the features described herein, or as an alternative, further embodiments of the child restraint systems may include that the child seat is slidable in a direction along the seat axis, in both the travel position and the loading position.

According to some embodiments, child restraint systems include a support base installable on a vehicle seat and a positioning assembly configured to support a child seat thereon, the positioning assembly being movably connected to the support base such that the positioning assembly can both translate relative to the support base and rotate relative to the support base.

In addition to one or more of the features described herein, or as an alternative, further embodiments of the child restraint systems may include that the positioning assembly is further configured to provide a recline movement of the child seat relative to the support base.

In addition to one or more of the features described herein, or as an alternative, further embodiments of the child restraint systems may include that the positioning assembly is rotatable about a pivot axis, and wherein the positioning assembly is translatable relative to the support base between a first translation position and a second translation position, wherein the pivot axis of the positioning assembly in the first translation position is spaced from the pivot axis of the positioning assembly in the second translation position.

In addition to one or more of the features described herein, or as an alternative, further embodiments of the child restraint systems may include that the pivot axis of the positioning assembly in the first translation position is parallel to the pivot axis of the positioning assembly in the second translation position.

In addition to one or more of the features described herein, or as an alternative, further embodiments of the child restraint systems may include that rotation of the positioning assembly relative to the support base causes translation of the positioning assembly relative to the support base.

In addition to one or more of the features described herein, or as an alternative, further embodiments of the child restraint systems may include that the rotation of the positioning assembly occurs simultaneously with the translation of the positioning assembly.

In addition to one or more of the features described herein, or as an alternative, further embodiments of the child restraint systems may include that the positioning assembly includes a first positioning element configured to couple to the child seat, a second positioning element arranged relative to the first positioning element, wherein the first positioning element is moveably connected to the second positioning element in a translating manner, and a third positioning element arranged relative to the second positioning element, wherein the second positioning element is movably connected to the third positioning element in a rotating manner. The second positioning element is arranged between the first positioning element and the third positioning element.

According to some embodiments, child restraint systems include a support base installable on a vehicle seat and a positioning assembly configured to support a child seat thereon, the positioning assembly being rotatably connected to the support base, the positioning assembly being rotatable about a pivot axis between a first rotation position and a second rotation position, wherein the pivot axis of the positioning assembly in the first rotation position is spaced from the pivot axis of the positioning assembly in the second rotation position.

In addition to one or more of the features described herein, or as an alternative, further embodiments of the child restraint systems may include that the pivot axis of the positioning assembly in the first rotation position is parallel to the pivot axis of the positioning assembly in the second rotation position.

In addition to one or more of the features described herein, or as an alternative, further embodiments of the child restraint systems may include that the support base has a base axis that extends from a rear end of the support base to a front end of the support base, wherein the positioning assembly is further configured such that in the first rotation position a center of gravity of the child seat intersects the base axis, and in the second rotation position the center of gravity of the child seat is offset from the base axis.

In addition to one or more of the features described herein, or as an alternative, further embodiments of the child restraint systems may include that the child seat has a front end and a rear end spaced from the front end along a seat axis, wherein the positioning assembly is further configured such that during rotation of the positioning assembly from the first rotation position to the second rotation position the front end of the child seat moves along a partial elliptical path.

According to some embodiments, child restraint systems include a support base installable on a vehicle seat and a positioning assembly configured to support a child seat thereon, the positioning assembly being movably connected to the support base such that a rotation of the positioning assembly relative to the support base causes translation of the positioning assembly relative to the support base.

In addition to one or more of the features described herein, or as an alternative, further embodiments of the child restraint systems may include that the positioning assembly includes a first positioning element having a track defined thereon, a second positioning element having a track defined thereon, and at least one post arranged in the track of the first positioning element and the track of the second positioning element, wherein each track comprises an arcuate path on the respective positioning element.

In addition to one or more of the features described herein, or as an alternative, further embodiments of the child restraint systems may include that the positioning assembly includes a first positioning element having a track defined thereon, a second positioning element having a track defined thereon, and at least one post arranged in the track of the first positioning element and the track of the second positioning element, wherein each track comprises a cross-shape on the respective positioning element.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 6A is a schematic illustration of a child restraint system in accordance with an embodiment of the present disclosure, illustrated in a travel position;

FIG. 6B is a schematic illustration of the child restraint system of FIG. 6A as shown in a loading position;

FIG. 10A is a schematic illustration of a portion of a child restraint system in accordance with an embodiment of the present disclosure;

FIG. 10B is a plan view of the child restraint system of FIG. 10A, in a travel position;

FIG. 10C is a plan view of the child restraint system of FIG. 10A, in a loading position;

FIG. 11A is a schematic illustration of a portion of a positioning assembly in accordance with an embodiment of the present disclosure;

FIG. 11B is a plan view of the positioning assembly of FIG. 11A, in a travel position;

FIG. 11C is a plan view of the positioning assembly of FIG. 11A, in a loading position;

FIG. 12A is a schematic illustration of a portion of a positioning assembly in accordance with an embodiment of the present disclosure;

FIG. 12B is a plan view of the positioning assembly of FIG. 12A, in a travel position;

FIG. 12C is a plan view of the positioning assembly of FIG. 12A, in a loading position;

FIG. 13C illustrates the child seat of FIG. 13A and the support base 13B in a first position; and FIG. 13D illustrates the child seat of FIG. 13A and the support base 13B in a second position.

DETAILED DESCRIPTION

A detailed description of one or more embodiments of the disclosed apparatus and method are presented herein by way of exemplification and not limitation with reference to the Figures.

Figure 1:
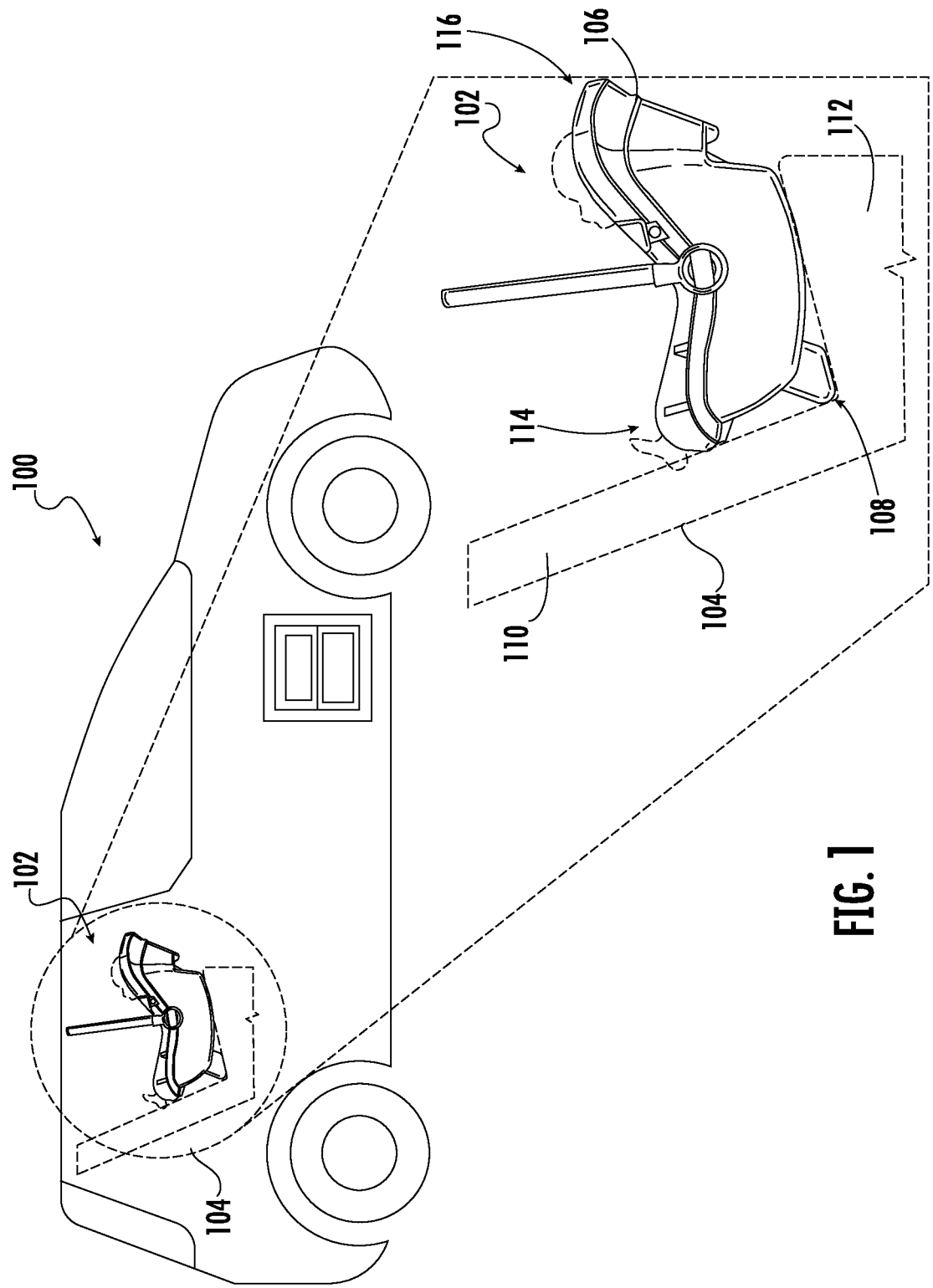
FIG. 1 is a schematic illustration of a vehicle and a child restraint system that may incorporate embodiments of the present disclosure installed therein.

Referring to FIG. 1, a schematic illustration of a vehicle 100 and a child restraint system 102 that may incorporate embodiments of the present disclosure are shown. As shown in FIG. 1, the vehicle 100 (e.g., a personal vehicle, a ride-hail or rideshare vehicle, or the like) includes a vehicle seat 104 to which the child restraint system 102 is installed. The child restraint system 102 includes an infant car seat 106 that is secured, via an anchor system 108 (schematically shown), to the vehicle seat 104 of the vehicle 100. The vehicle seat 104 has a vehicle seat back 110, a vehicle seat pan 112, and a seat bight (i.e., the region of intersection of the vehicle seat back 110 and the vehicle seat pan 112). The anchor system 108 is configured to secure the infant car seat 106 to the vehicle seat 104. The anchor system 108 may help ensure that installation of the infant car seat 106 provides a tight fit to the vehicle seat 104 such that when installed, the infant car seat system 106 will ensure a safe and secure attachment and installation within the vehicle 100.

As shown in FIG. 1, the infant car seat 106 is secured to the vehicle seat 104 in a rear-facing orientation, in which a front 114 of the infant car seat 106 faces the vehicle seat back 110 and a back 116 of the infant car seat 106 is arranged away from the vehicle seat back 110. As such, when a child is seated in the infant car seat 106, the child's feet will be at the front 114 of the infant car seat 106 and the child's head will be at the back 116 of the infant car seat 106. Accordingly, the infant car seat 106 is a rear-facing child car seat.

Although shown with specific child car seat configurations, embodiments of the present disclosure may be applicable to a variety of different vehicle child seats. For example, the child seats of the present disclosure may be convertible child seats, infant child seats, or the like. As used herein, the term "convertible child seat" refers to a seat that may be used in both a rearward-facing direction and a forward-facing direction, such as suitable for use, for example, by a child between 5 pounds and 65 pounds and/or up to 49 inches in height. The convertible child seat may also be referred to herein as an upright child seat or a toddler seat. As used herein, the term "infant child seat" refers to a seat as would be defined by one of ordinary skill in the art. For example, an infant child seat may be described as a seat for use by an infant or child too small to use a convertible child seat and may include a carrying handle to allow for portability of the infant child seat external to the vehicle.

When loading a child into a vehicle, or removing a child from a vehicle, caregivers (e.g., provider, parent, guardian, etc. generally referred to as "caregiver") may find it difficult to get children into and out of the child restraint system while the child seat is installed in a vehicle. This may be especially true for rearward-facing configurations. For example, it may be difficult for the caregiver to bend over and reach into the vehicle to position and buckle the child into the seat. The space between the sides of the child restraint system and the roof/doors of the vehicle can create a limited space for the caregiver to maneuver. The same difficulty arises when removing the child from the car seat while it is installed in a vehicle. For young infants, a lift-out seat is common to address this problem. However, as the child grows, the increased weight of the child increases the difficulty of lifting a seat out of the vehicle. Because of this difficulty, the caregiver may tend to leave the lift-out seat portion in the vehicle and is thus required to bend and reach into the vehicle to properly secure the child. In view of this, embodiments of the present disclosure seek to bring the child toward the caregiver, thus limiting the bending and reaching that is required to move the child in and out of the car seat.

Figure 2A:
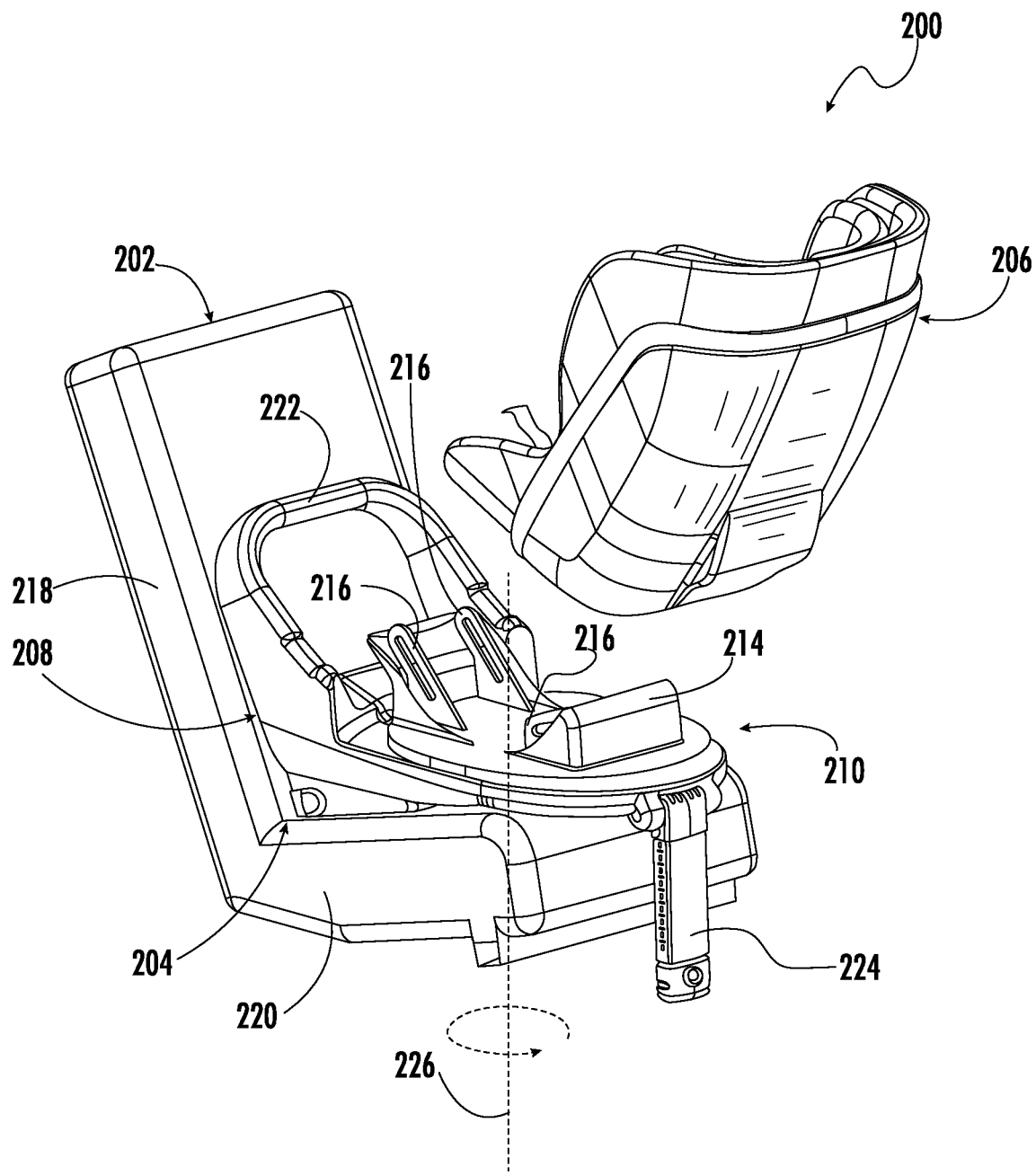
FIG. 2A is a schematic illustration of a child restraint system in accordance with an embodiment.
Figure 2B:
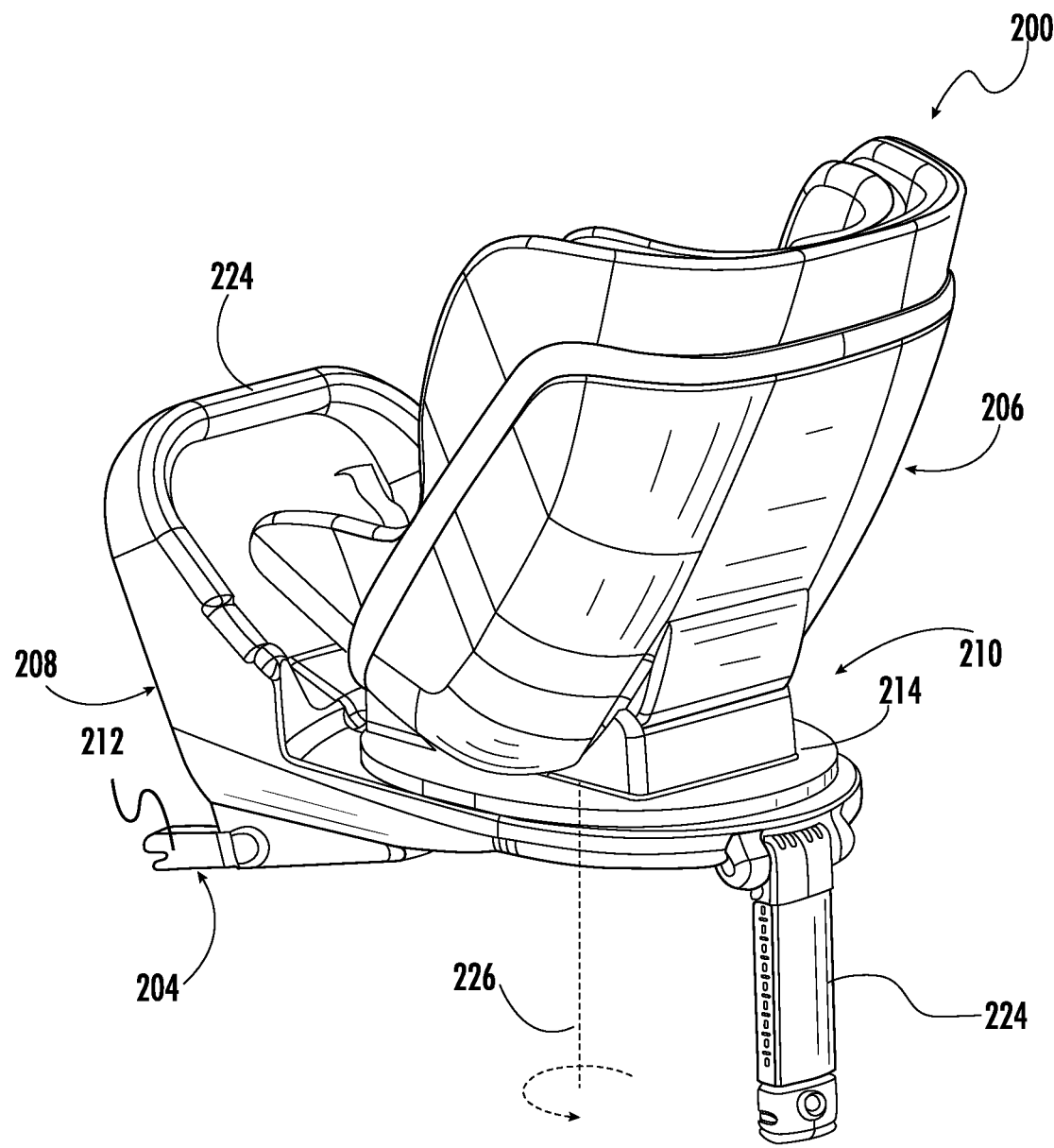
FIG. 2B illustrates the child restraint system of FIG. 2A, in a first position.
Figure 2C:
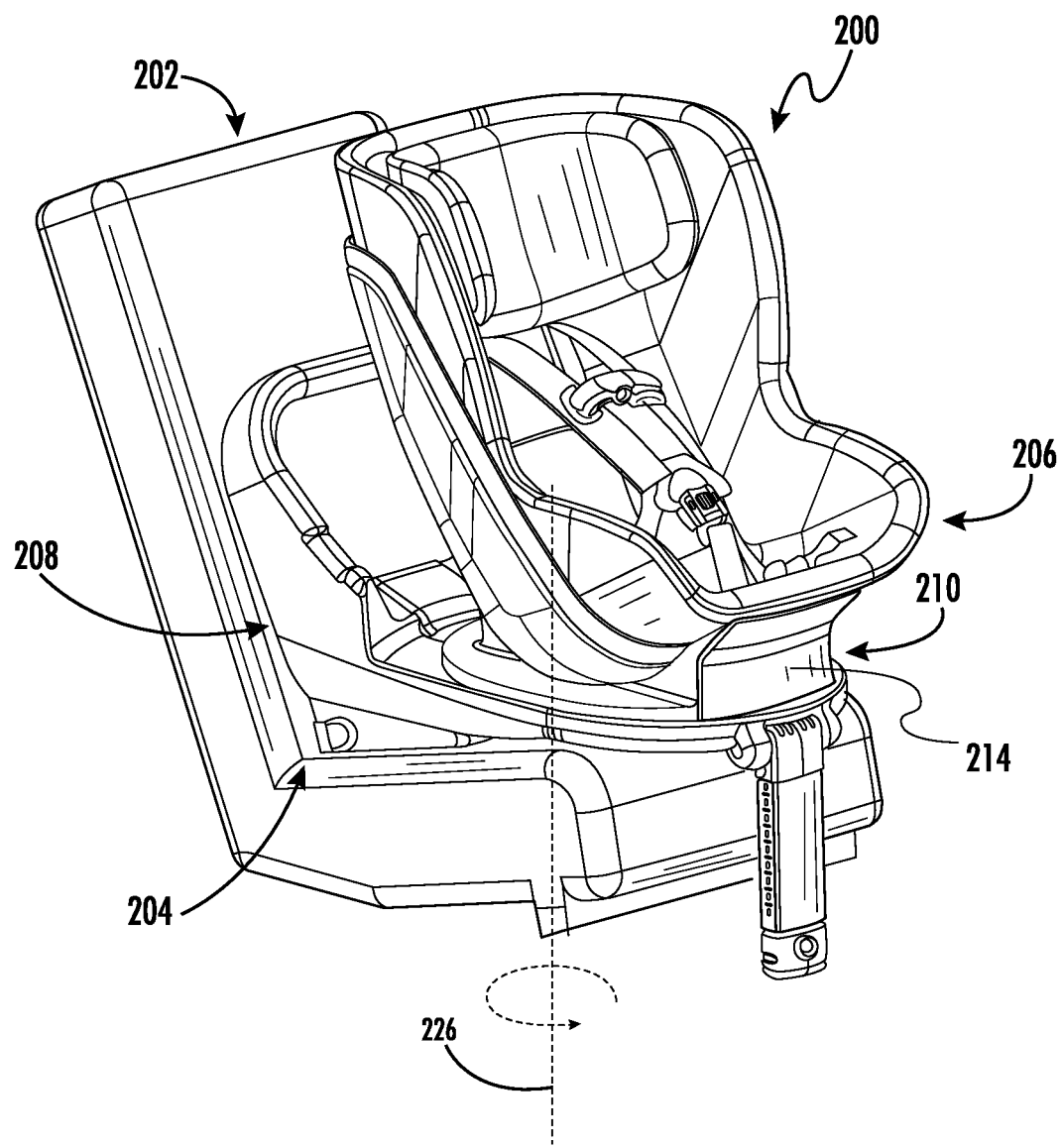
FIG. 2C illustrates the child restraint system of FIG. 2A, in a second position.

With reference now to the FIGS. 2A-2C, an example of a child restraint system 200 is illustrated according to an embodiment. The child restraint system 200 can be detachably fixed to or supported on a vehicle seat 202, such as via a latch or anchor mechanism 204. This latch or anchor system may be referred to as a "lower anchor and tether for children" (e.g., a LATCH system). Alternatively, or in addition, the child restraint system 200 may be detachably fixed to the vehicle seat 202 via a vehicle belt associated with the vehicle seat 202.

As shown, the child restraint system 200 includes a child seat 206 and a support base 208. The support base 208, in this illustrative configuration, includes a positioning assembly 210 configured to allow for adjustment or change of a position and/or orientation of the child seat 206 relative to the support base 208 and/or the vehicle seat 202. The support base 208 includes the anchor mechanism 204 having a securing mechanism 212, such as a releasable hook or latch, at an end thereof. FIG. 2A illustrates the child seat 206 as separated from the support base 208, FIG. 2B illustrates the child seat 206 as installed on the support base 208 in a first facing orientation (e.g., rearward-facing), and FIG. 2C illustrates the child seat 206 as rotated by the positioning assembly 210 to a second facing orientation (e.g., forward-facing).

In this illustrative embodiment, the positioning assembly 210 includes a positioning element 214 for connection with the child seat 206, the positioning element 214 being movable to the structure of the support base 208. As shown in FIG. 2A, the child seat 206 may be separable from the positioning element 214 of the support base 208. Such separability may be provided by releasable pins, snaps, clips, slot-engagements, or the like. In other embodiments, the child seat 206 and the positioning element 214 and/or the support base 208 may be assembled as a non-separable structure, such as assembled in a manner that the child seat 206 is not removable from the support base 208. However, in embodiments with a removable child seat 206, the child seat 206 may be configured to be removeable from installation within a vehicle to installation on a stroller or otherwise used independently from other structures or assemblies. In some embodiments, such as when the child seat 206 is not removable from the support base 208, even when non-separably coupled together, the child seat 206 may be reclinable or otherwise moveable (but not separable) relative to the support base 208.

As shown in FIG. 2A, the positioning element 214 of the positioning assembly 210 may include recline structures 216 that are configured to allow adjustment of a recline of the child seat 206 relative to the support base 208. In FIG. 2A, the child restraint system 200 is shown partially installed to the vehicle seat 202. The vehicle seat 202 includes a vehicle seat back 218 and a vehicle seat pan 220. The support base 208 is configured to rest upon the vehicle seat pan 220 of the vehicle seat 202 and support the child seat 206 thereon. In this illustrative configuration, the child restraint system 200 includes a rebound bar 222 that extends from a portion of the support base 208 that rests upon the vehicle seat pan 220, with the rebound bar 222 extending upward therefrom to rest on the vehicle seat back 218. The rebound bar 222 may provide stability to the child restraint system 200 in the event of a collision or the like.

In the illustrated, non-limiting embodiment, a stability leg 224, having a fixed or adjustable length, is connected to a portion of the support base 208. As shown, the stability leg 224 is arranged an end of the support base 208 opposite from the rebound bar 222. The stability leg 224 can be rotatable or foldable relative to the support base 208 between an extended configuration (as shown in a partially extended state), in which the stability leg 224 may be configured to abut against a vehicle floor and provide support to the child restraint system 200, and a retracted configuration, in which the stability leg 224 is stowed underneath or within a cavity of the child restraint system 200 (e.g., beneath or within a bottom surface thereof). In some configurations, when in the retracted configuration, the stability leg 224 may protrude slightly from the bottom surface of the support base 208 such as to encourage the use of the stability leg 224 during installation of the child restraint system 200 in a vehicle.

In accordance with embodiments of the present disclosure, the positioning assembly 210, may provide for one or more degrees of movement and adjustment of the child seat 206 relative to the support base 208. For example, the positioning element 214 may provide a first degree of adjustment through the recline structures 216 of the positioning element 214, which permits adjustment of a recline orientation of the child seat 206 relative to the support base 208. A second degree of adjustment may be provided, for example, through interaction of the positioning element 214 with the support base 208 to which the positioning element 214 is coupled. For example, the positioning element 214 may be rotatably coupled to the support base 208 and rotatable about an axis 226. As such, the child seat 206 may be rotatable relative to the support base 208 and/or the vehicle seat 202 about the axis 226. In some embodiments, the angle of rotation may be completely free, to allow 360 degrees of rotation about the axis 226. In other embodiments, a limited angle of rotation may be set, such as 180 degrees, for example. FIGS. 2A-2B illustrate the child seat 206 in a rearward-facing orientation (relative to the vehicle seat 202) and FIG. 2C illustrates the child seat 206 rotated 180 degrees and in a forward-facing orientation (relative to the vehicle seat 202). It will be appreciated that any angle between 0 degrees (FIGS. 2A-2B) and 180 degrees (FIG. 2C) may be possible, as the child seat 206 may be freely rotatable about the axis 226, even if the total angle of rotation may be restricted and less than 360 degrees. For example, the child seat 206 may be rotated 90 degrees such that it faces normal to the forward-rearward direction (e.g., toward a vehicle door to the side). Such rotational orientation may provide for improved ease of use and access for a caregiver when placing a child in the child seat 206 or removing a child therefrom.

In accordance with embodiments of the present disclosure, in addition to providing rotation of a child seat (e.g., between a forward-facing position and a rearward-facing position and positions therebetween), some embodiments of the present disclosure also provide for additional rotation and/or translation of the child seat. For example, in accordance with some embodiments of the present disclosure, the child seat and supporting structures may be configured to allow movement of the child seat toward the parent for ease of access during securing or removal of the child. Such additional movements may include, for example, sliding, pivoting, translation, tilting, and/or combinations of movements.

In accordance with a non-limiting embodiment, child restraint systems include a rearward-facing car seat that improves the usability by allowing movement of the child toward the caregiver to allow easier loading and unloading of the child. The child restraint system, for example, may include a lower stationary support base which may be affixed securely to the vehicle using any available method such as LATCH, load leg, tether, vehicle belts, or the like. The portion of the child restraint system which holds the child (e.g., child seat) is placed above the lower portion and secured to the lower portion in a way sufficient to transfer all forces experienced in a vehicle crash. The child seat may include a five-point harness for retaining and restraining the child in the child seat and any adjustments needed to accommodate growth of the child and/or for adjustment between reclining and non-reclining positions.

In accordance with some embodiments, there may be a mechanism and various intermediate parts between the child seat (e.g., upper portion) and the support base (e.g., lower stationary portion) of the child restraint system. The child seat may be connected to a positioning assembly that allows the child seat to slide (e.g., forward, backward, to the side, etc.) relative to the lower stationary portion or support base. In some embodiments, the positioning assemblies may include a sliding layer and a pivoting layer. The pivoting layer may be configured to allow turning of all of the components attached thereto (e.g., child seat, other layers). The pivoting may be to a side relative to the support base, causing a foot end of the child restraint system (e.g., where the feet of the child occupant point) to point toward a side of the vehicle. Accordingly, in some embodiments, by adjusting the pivot layer to the side, the axis of movement of the sliding layer may be changed so that the axis of the slide direction points toward the sides of the vehicle instead of the front and back of the vehicle. As such, sliding of the child seat moves the child toward the side of the vehicle and into a position which is convenient for a caregiver to install or remove a child from the child seat.

Figure 3A:
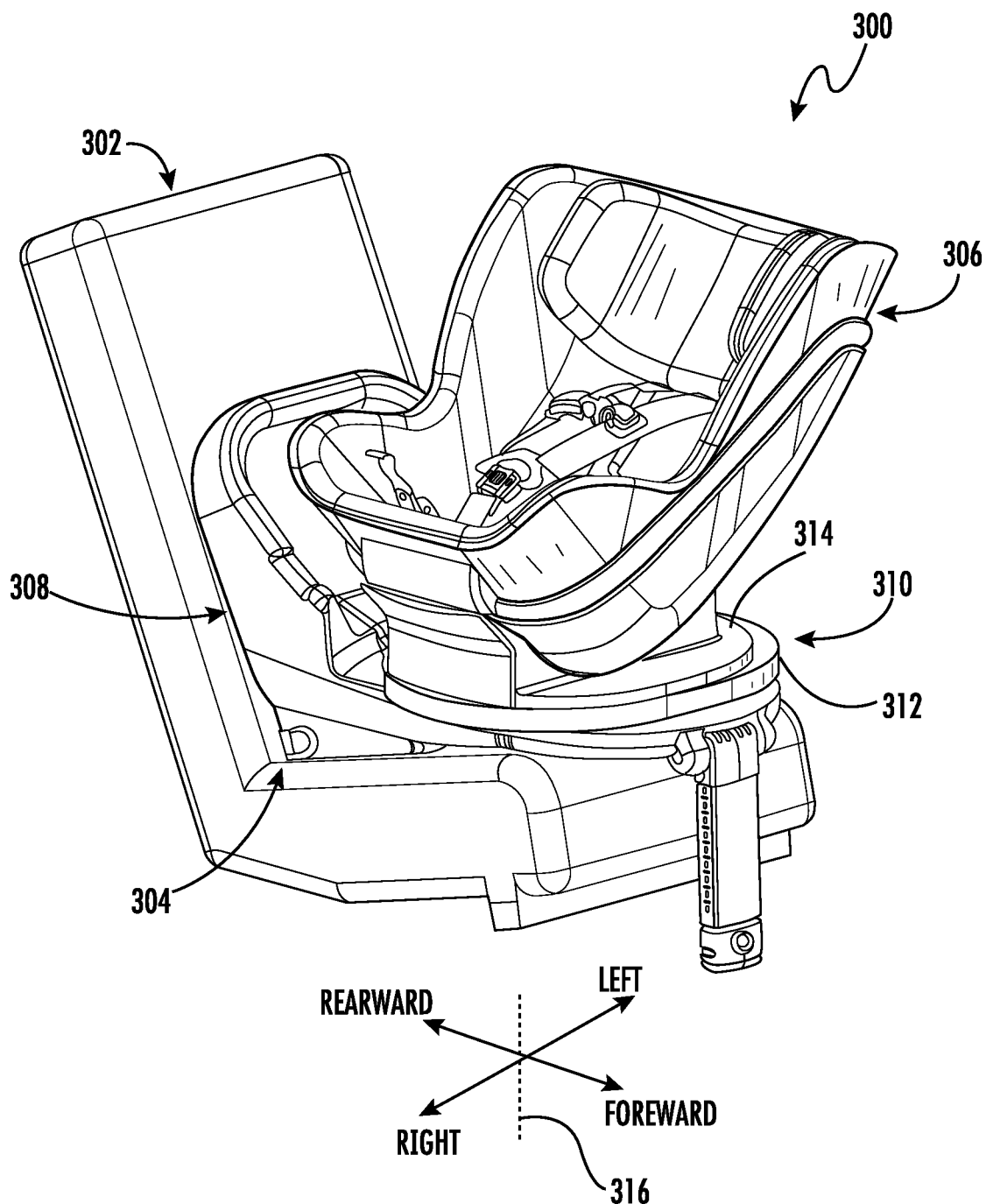
FIG. 3A is a schematic illustration of a child restraint system in accordance with an embodiment, shown in a rotated position.
Figure 3B:
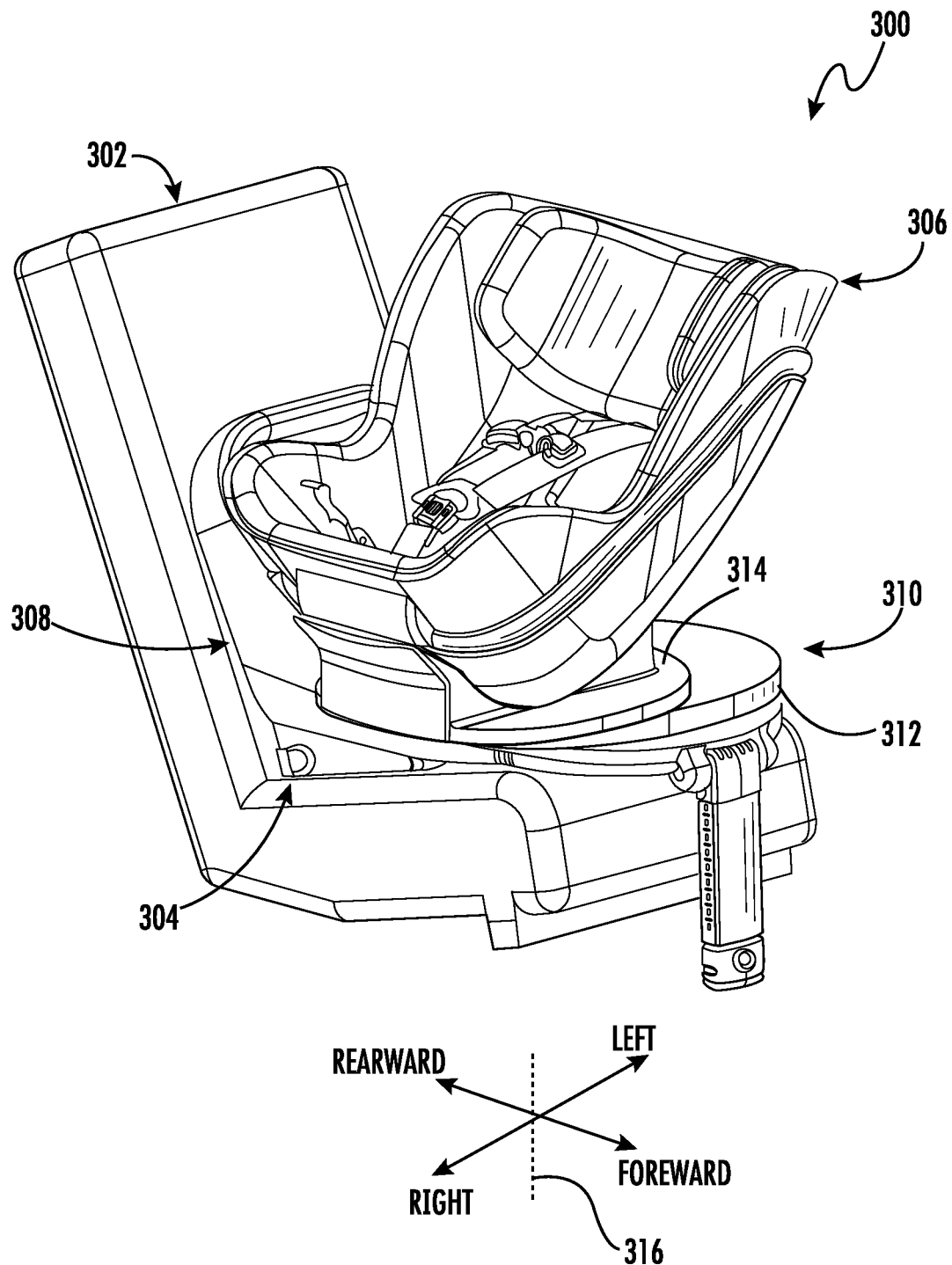
FIG. 3B illustrates the child restraint system of FIG. 3A, in a rotated and translated position.

Referring to FIGS. 3A-3B, schematic illustrations of a child restraint system 300 installed on a vehicle seat 302 in accordance with an embodiment of the present disclosure are shown. FIG. 3A illustrates the child restraint system 300 in a first state or position (e.g., side-facing) and FIG. 3B illustrates the child restraint system 300 in a second state or position (e.g., extended side-facing). The child restraint system 300 may be releasably secured to the vehicle seat 302 by an anchor mechanism 304 and includes a child seat 306 movably mounted to a support base 308, which may be configured as described herein (e.g., as shown and described above or below). The child restraint system 300 of FIGS. 3A-3B is similar to that shown and described with respect to FIGS. 2A-2C, having a positioning assembly 310 arranged between the support base 308 and the child seat 306. In this configuration, the positioning assembly 310 includes a first positioning element 312 and a second positioning element 314.

The first positioning element 312 of the positioning assembly 310 in FIGS. 3A-3B may be similar, in part, to the positioning element 214 shown in FIGS. 2A-2C. That is, the first positioning element 312 of the positioning assembly 310 may be a rotatable base or structure that is rotatably mounted or configured relative to the support base 308. As such, the first positioning element 312 may be referred to as a pivot or rotating base. The first positioning element 312 may provide a first degree of freedom in the form of rotation about an axis 316 (e.g., an axis through the child restraint system 300, and similar to axis 226). A second degree of freedom may be provided through the second positioning element 314 of the positioning assembly 310. The second positioning element 314 is configured to provide translating or sliding movement of the child seat 306 relative to the first positioning element 312 and the support base 308. For example, as shown in FIG. 3B, the child seat 306 and the second positioning element 314 are translated in position relative to the first positioning element 312 and the rest of the support base 308.

With reference to FIGS. 3A-3B, the first positioning element 312 of the positioning assembly 310 may provide rotation about the axis 316 to change a directional position of the child seat 306 relative to the support base 308 (and the vehicle seat 302 when installed in a vehicle). In some configurations, the angle of rotation provided by the first positioning element 312 may be restricted to 90 degrees. Such rotation may be to transition from a use-position (e.g., forward-facing or rearward-facing) to a loading position (e.g., side facing, such as left-facing or right-facing). In other embodiments, the rotation may be restricted to 180 degrees, allowing for transition from forward-facing to rearward-facing, and angles therebetween. Further still, in some embodiments, full 360 degree rotation may be provided, allowing for positioning and facing for rearward-facing, forward-facing, left-facing, right-facing, and angles therebetween. In some embodiments, the second positioning element 314 may provide sliding or translating movement of the child seat 306 relative to the first positioning element 312 in any angle or direction of orientation. In other embodiments, the sliding or translating motion may be locked relative to the first positioning element 312 and/or the support base 308, except for when the first positioning element 312 is in certain predefined positions (e.g., only in forward/rearward and/or right/left side facing orientations, but not in angles therebetween).

It will be appreciated that the right and left directions are toward a vehicle side and thus toward a door of the vehicle. Accordingly, the child restraint system 300 having a rotating capability enables a caregiver to rotate the child seat 306 from a travel position (e.g., forward-facing or rear-facing) to a loading position (e.g., side-facing). In the side-facing orientation, the caregiver may be provided with improved ease of use and access to load and unload a child from the child seat 306. In accordance with some embodiments of the present disclosure, child restraint systems are provided that allow a child seat to slide-out and rotate-out toward a vehicle door, and thus improve the loading/unloading of a child to/from the child seat.

Figure 4:
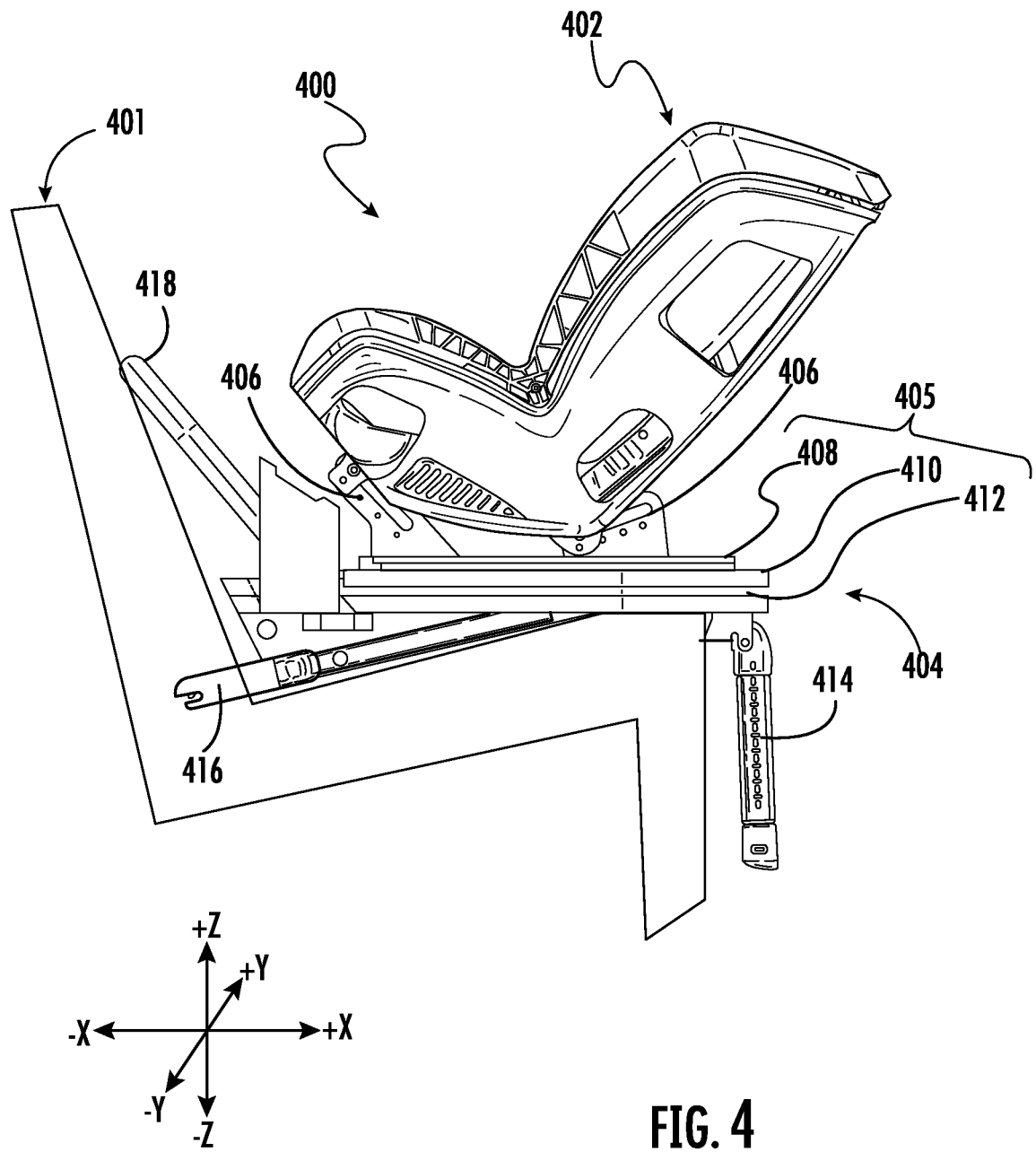
FIG. 4 is a schematic illustration of a child restraint system in accordance with an embodiment of the present disclosure.

Referring now to FIG. 4, a schematic illustration of a child restraint system 400 in accordance with an embodiment of the present disclosure is shown. The child restraint system 400 may be similar to that shown and described above. The child restraint system 400 includes a child seat 402 mounted to a support base 404. The child seat 402 may be a convertible child seat, an infant child seat, or other seat or the like for providing a seat or space to secure a child within a vehicle. The support base 404 of the child restraint system 400 may be configured to securely attach to a vehicle seat 401 or other vehicle structure.

The child seat 402 may be moveable relative to the support base 404. For example, one or more recline structures 406 may be provided at an interface between the child seat 402 and the support base 404. The recline structures 406 may be configured to fixedly, selective fixedly, or movably connect and attach the child seat 402 to the support base 404. In some embodiments, the child seat 402 may be permanently, but moveably, mounted to the support base 404 through the recline structures 406. In other embodiments, the child seat 402 may be removably installed to the support base 404 through the recline structures 406 and may be reclining movable along the recline structures 406. The recline structures 406 may be brackets or similar structures with tracks, slots, or the like to permit recline and incline of the child seat 402 relative to the support base 404. With reference to FIG. 4, the recline structures 406 permit adjustment of the child seat 402 within the x-z plane and provide a reclining motion that is in the forward-rearward direction (+x/−x direction) and the up-down direction (+z/−z direction).

In addition to the recline structures 406, the support base 404, in this configuration, includes a positioning assembly 405. The positioning assembly 405 is configured to provide additional degrees of freedom of movement or adjustment of the child seat 402. The positioning assembly 405 includes a first positioning element 408, a second positioning element 410, and a third positioning element 412. Although shown with three separate and distinct positioning elements, in other configurations, fewer or greater numbers of positioning elements may be provided, combining or separating out various functionality as described herein and/or providing additional functionality. The positioning elements may be arranged a plate-like structures, as shown, or may take other forms or shapes, without departing from the scope of the present disclosure.

In this illustrative, non-limiting embodiment, the recline structures 406 are fixedly attached to or part of (e.g., integrally formed with) the first positioning element 408. In other embodiments, the recline structures 406 may be selectively removable from the first positioning element 408. The child seat 402 may be selectively movable relative to the recline structures 406 to provide a reclining or tilting movement to the child seat 402 relative to the support base 404 or the vehicle seat 401 (e.g., within the x-z plane). In this illustrative configuration, the first positioning element 408 is a top layer upon which the recline structures 406 and/or the child seat 402 may be attached (e.g., permanently or removably). The first positioning element 408 may be configured to slide relative to the rest of the support base 404. For example, the first positioning element 408 may be slidable on and/or relative to the second positioning element 410. In the orientation of FIG. 4, the first positioning element 408 may slide in the +x and −x directions on or relative to the second positioning element 410.

The second positioning element 410 is arranged between the first positioning element 408 and the third positioning element 412. The second positioning element 410 may be configured to pivot or rotate relative to the other positioning elements 408, 412 and/or the support base 404. The rotation provided by the second positioning element 410, in one non-limiting example, may be about a vertical axis (e.g., z-axis of FIG. 4) that passes through each of the positioning elements 408, 410, 412 (e.g., normal to a plane (x-y plane) defined by the second positioning element 410). In an embodiment, when the second positioning element 410 is rotated about the z-axis, the first positioning element 408 will be rotated therewith. As such, the sliding direction of the first positioning element 408 may change based on the orientation of the second positioning element 410. As noted above, in the configuration and orientation of FIG. 4, the first positioning element 408 is slidable in the +x and −x directions. However, when the second positioning element 410 is rotated 90 degrees, the direction of sliding of the first positioning element 408 may change to being slidable in the +y and −y directions.

The third positioning element 412 may be a stationary positioning element and may define one or more frames or tracks upon which one or both of the first positioning element 408 and the second positioning element 410 may move (e.g., slide, rotate, etc.). In some embodiments, the second positioning element 410 may include a frame or track upon which the first positioning element 408 may move (e.g., slide). In some embodiments, the third positioning element 412 may be integrally formed with or defined by the support base 404.

In this illustrative configuration, the child restraint system 400 includes various other features. For example, the child restraint system 400 may include a load leg 414 at a forward end of the support base 404. In some configurations, the load leg 414 may be pivotally or rotationally attached to a bottom surface of the third positioning element 412. The child restraint system 400 may also include a securing mechanism 416. The securing mechanism 416 may be configured as a latch or anchor mechanism. The latch or anchor mechanism may be referred to as a "lower anchor and tether for children" (e.g., a LATCH system). Alternatively, or in addition, the securing mechanism 416 may provide detachable fixing of the child restraint system 400 to the vehicle seat 401 via a vehicle belt associated with the vehicle seat 401 or by other means or mechanisms. The securing mechanism 416 may be connected to the child restraint system 400 at the support base 404 (e.g., to a lower surface of the third positioning element 412). The support base 404 may also include an optional rebound bar 418, such as for use in a rearward-facing direction (e.g., as shown in illustrative FIG. 4).

Figure 5:
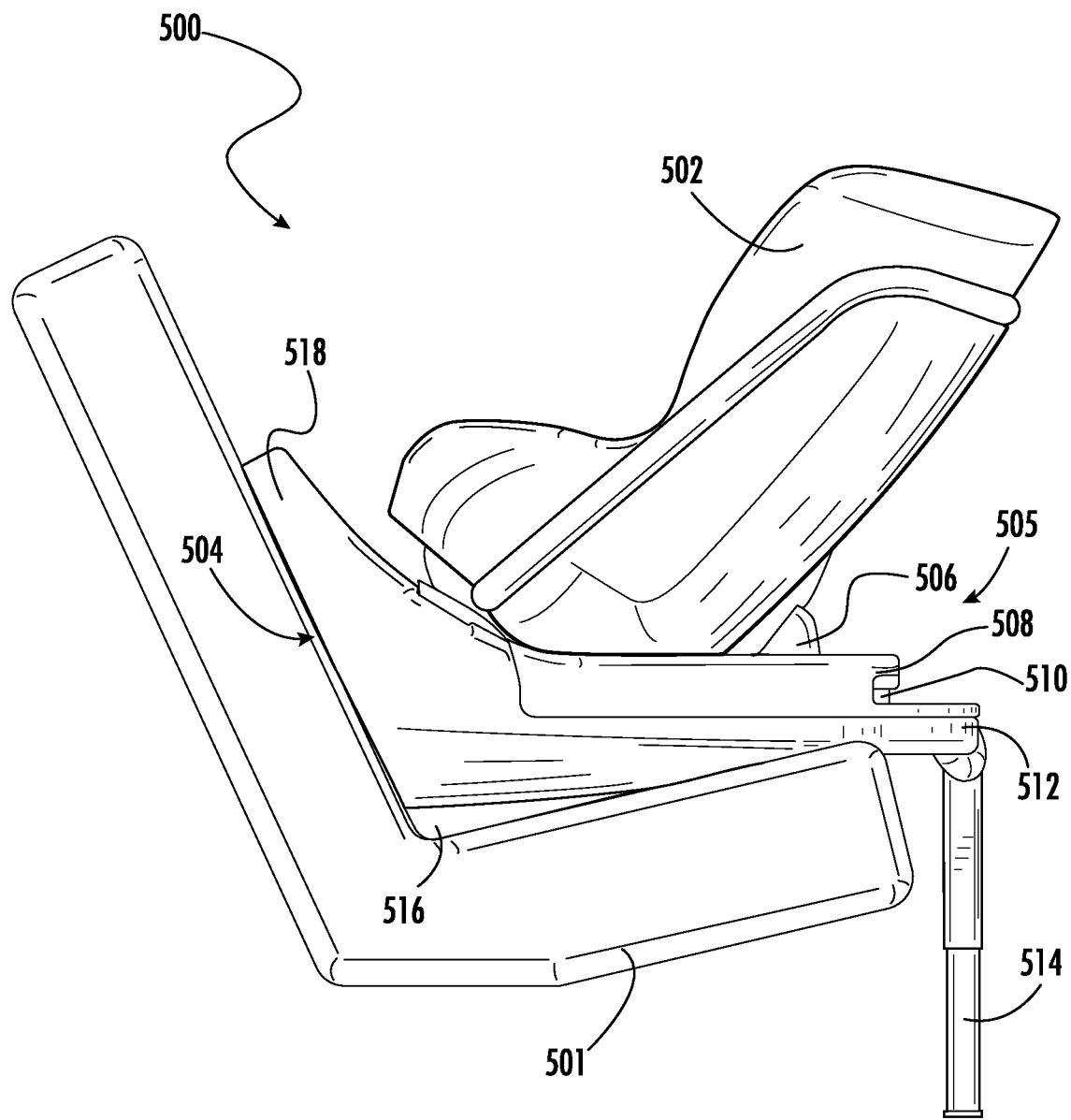
FIG. 5 is a schematic illustration of a child restraint system in accordance with an embodiment of the present disclosure.

Referring now to FIG. 5, a schematic illustration of a child restraint system 500 in accordance with an embodiment of the present disclosure is shown. The child restraint system 500 may be similar to that shown and described above. The child restraint system 500 includes a child seat 502 mounted to a support base 504. The child seat 502 may be a convertible child seat, an infant child seat, or other seat or the like for providing a seat or space to secure a child within a vehicle. The support base 504 of the child restraint system 500 may be configured to securely attach to a vehicle seat 501 or other vehicle structure.

In this configuration, the support base 504 and connection with the child seat 502 includes a positioning assembly 505 for adjusting the orientation and position of the child seat 502 relative to the support base 504. The positioning assembly 505 includes recline structures 506 for inclination movement, a first positioning element 508 (e.g., for sliding), a second positioning element 510 (e.g., for rotation or pivoting), and a third positioning element 512 (e.g., stationary positioning element). The support base 504 includes a load leg 514 and a securing mechanism 516. In this configuration, a rebound bar 518 is integrally formed with the material of the support base 504. In this configuration, the third positioning element 512 is integrally part of the support base 504.

Referring now to FIGS. 6A-6B, schematic illustrations of a child restraint system 600 in accordance with an embodiment of the present disclosure are shown. The child restraint system 600 may be similar to that shown and described above. The child restraint system 600 includes a child seat 602 mounted to a support base 604 having a positioning assembly 605. The child seat 602 may be a convertible child seat, an infant child seat, or other seat or the like for providing a seat or space to secure a child within a vehicle. The support base 604 of the child restraint system 600 may be configured to securely attach to a vehicle seat or other vehicle structure.

The configuration of FIGS. 6A-6B is similar to that shown and described in FIG. 4. For example, as shown, the child restraint system 600 includes the positioning assembly 605, having a first positioning element 606, a second positioning element 608, and a third positioning element 610. Although not labeled for clarity and simplicity, the child restraint system 600, and/or the support base 604 thereof, may include load legs, rebound bars, mounting brackets or the like (e.g., for tilting/reclining), and/or securing mechanisms. FIG. 6A illustrates the child restraint system 600 in a first position or first state (e.g., travel position) and FIG. 6B illustrates the child restraint system 600 in a second position or second state (e.g., loading position). In this illustrative configuration, the child seat 602 is of a non-removable configuration, with the child seat 602 being non-removable from the support base 604. However, in other embodiments, configurations are contemplated where the child seat is removable from the support base 604.

In this illustrative configuration, the first positioning element 606 may be configured to slide relative to the second positioning element 608 and to support the child seat 602 such that when the first positioning element 606 moves, so does the child seat 602. The second positioning element 608 may be rotatable relative to the third positioning element 610, with the first positioning element 606 and the child seat 602 rotating with rotation of the second positioning element 608. The third positioning element 610 may be a fixed or stationary positioning element for supporting and securing the child restraint system 600 on and to a vehicle or vehicle seat.

In the first position (e.g., travel position (FIG. 6A)), the positioning elements 606, 608, 610 are stacked such that the first positioning element 606 is positioned above the second positioning element 608, which in turn is positioned above the third positioning element 610. Further, each positioning element 606, 608, 610 has a primary axis or long axis that is arranged in alignment with the other positioning elements 606, 608, 610, when in the first position. The result is a relatively low or narrow profile. Such a low or narrow profile may provide for a fit within or on a vehicle seat and provide a positioning and orientation of an occupant within the child seat 602 to be safely secured within the vehicle.

To transition to the second position (e.g., loading position; FIG. 6B), the second positioning element 608 may be rotated relative to the third positioning element 610. As the second positioning element 608 is rotated (e.g., by 90°), as shown in FIG. 6B, the first positioning element 606 may also be rotated therewith. That is, the first positioning element 606 may be positionally attached to the second positioning element 608 such that rotation of the second positioning element 608 causes rotation of the first positioning element 606 (e.g., the first positioning element 606 may be carried by the second positioning element 608 during the rotation). With the second positioning element 608 rotated, the first positioning element 606 may then slide relative to the second positioning element 608. The sliding movement of the first positioning element 606 will cause the child seat 602 to be slidingly moved relative to both the third positioning element 610 and the second positioning element 608. As such, the child seat 602 may be rotated and translated from the travel position (FIG. 6A) to a loading position (FIG. 6B) and thus ease of use is improved for a caregiver. When installed within a vehicle, the loading position (FIG. 6B) is an orientation where a front of the child seat 602 faces a door of the vehicle, and a caregiver is provided access to the child seat 602 without requiring entering the vehicle (e.g., leaning into the vehicle).

Figure 7A:
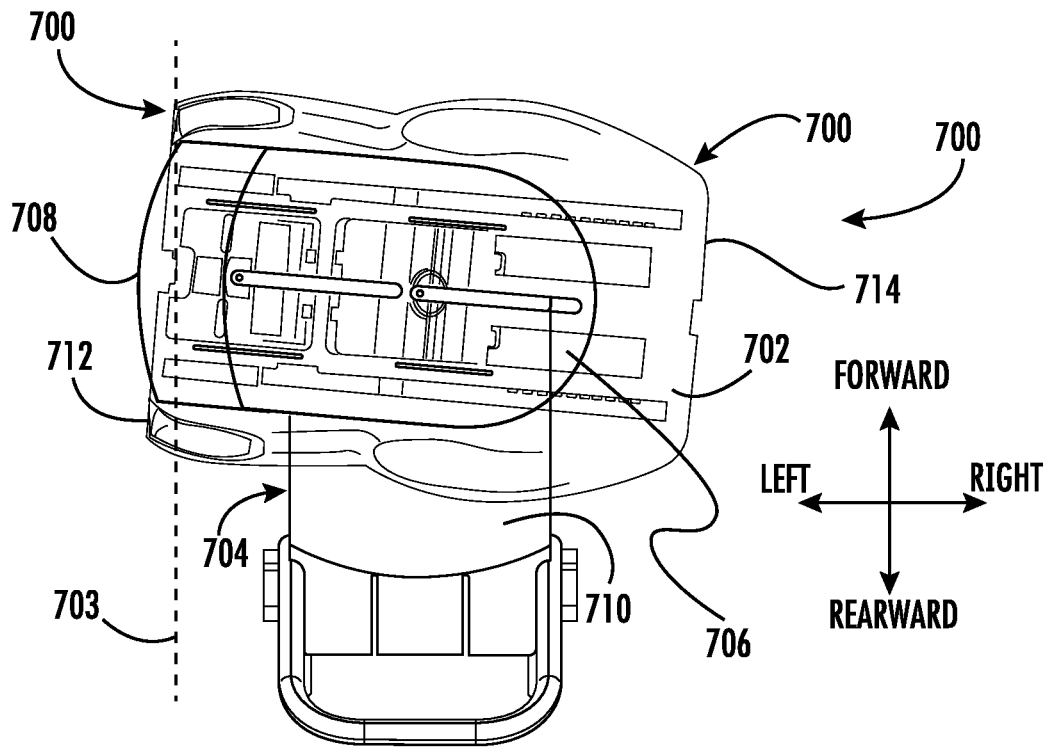
FIG. 7A is a schematic illustration of a child restraint system in accordance with an embodiment of the present disclosure, illustrated in a partial transition from a travel position to a loading position and relative to a vehicle side.
Figure 7B:
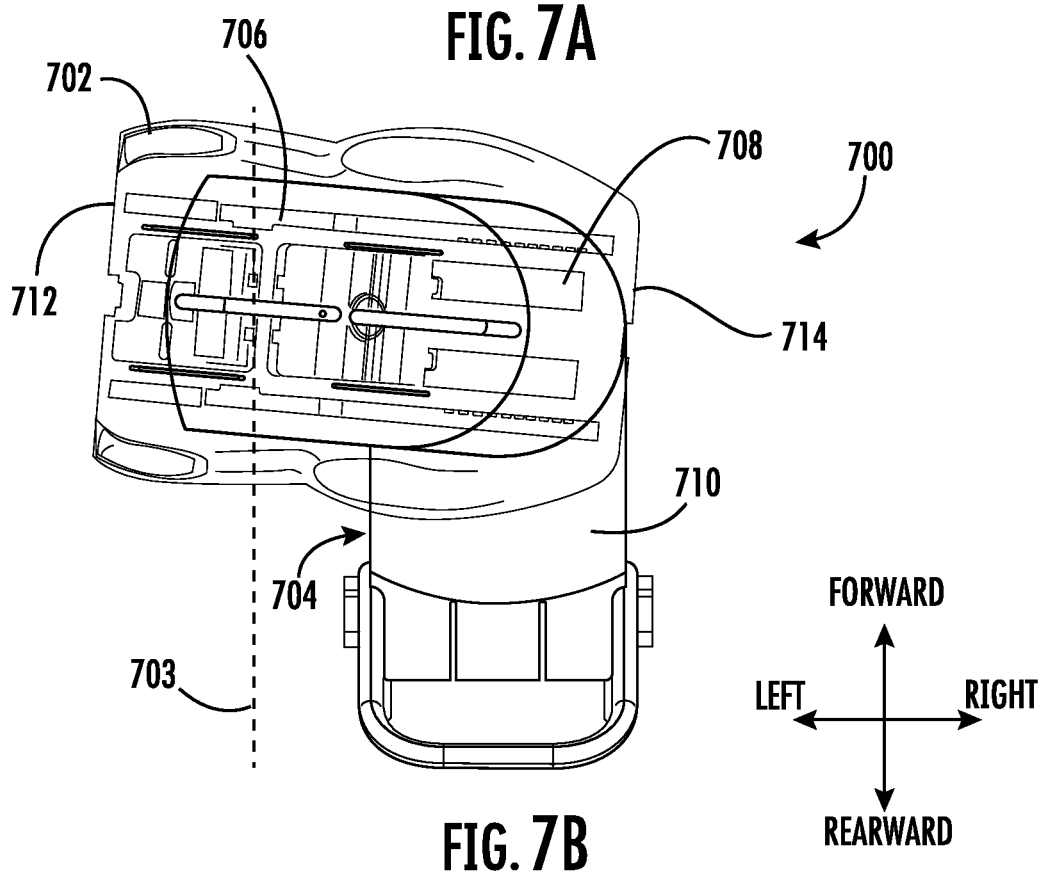
FIG. 7B is a schematic illustration of the child restraint system of FIG. 7A as shown in an extended loading position and relative to the vehicle side.

Referring now to FIGS. 7A-7B, schematic illustrations of a child restraint system 700 in accordance with an embodiment of the present disclosure are shown. The child restraint system 700 may be similar to that shown and described above. The child restraint system 700 includes a child seat 702 mounted to a support base 704 having a positioning assembly. The child seat 702 may be a convertible child seat, an infant child seat, or other seat or the like for providing a seat or space to secure a child within a vehicle. The support base 704 of the child restraint system 700 may be configured to securely attach to a vehicle seat or other vehicle structure.

The configuration of FIGS. 7A-7B is similar to that shown and described above. For example, as shown, the child restraint system 700 includes a support base 704 having a positioning assembly having a first positioning element 706, a second positioning element 708, and a third positioning element 710. Although not labeled for clarity and simplicity, the child restraint system 700, and the support base 704 thereof, may include load legs, rebound bars, mounting brackets or the like (e.g., for tilting/reclining), and/or securing mechanisms. FIG. 7A illustrates the child restraint system 700 in a first transitory position (e.g., transitioning between a travel position and a loading position) and FIG. 7B illustrates the child restraint system 700 in a second position (e.g., a loading position). FIGS. 7A-7B illustrate the relative position of the child seat 702 and the child restraint system 700 relative to a vehicle side 703 (illustrated as a dashed line).

In this configuration, the first positioning element 706 may be configured to slide relative to the second positioning element 708 and to support the child seat 702 such that when the first positioning element 706 moves, so does the child seat 702. The second positioning element 708 may be rotatable relative to the third positioning element 710, with the first positioning element 706 and the child seat 702 rotating with rotation of the second positioning element 708. The third positioning element 710 may be a fixed or stationary positioning element for supporting and securing the child restraint system 700 on and to a vehicle or vehicle seat.

As shown in FIG. 7A, the child seat 702, the first positioning element 706, and the second positioning element 708 are rotated relative to the third positioning element 710 of the support base 704. In this configuration, the child seat 702 is a rearward-facing seat, with a foot end 712 of the child seat 702 and a head end 714 of the child seat 702 rotated relative to a travel position and toward a loading position. In this intermediate position, the child seat 702 is still in a position that is unmoved relative to the first positioning element 706 and the second positioning element 708 but is rotated relative to the third positioning element 710. That is, the child seat 702 is rotated relative to the vehicle side 703 to provide improved access for a caregiver when loading or unloading a child into or from the child seat 702.

In FIG. 7B, the child seat 702 is moved in a sliding motion as the first positioning element 706 is translated or slidingly moved relative to the second positioning element 708 (and relative to the third positioning element 710). As illustratively shown in FIG. 7B, as compared to FIG. 7A, the child seat 702 extends outward to a side of the support base 704 (e.g., outward from the vehicle side 703). This extension to the side may provide improved accessibility and ease of use of the child seat 702 (e.g., when placing a child in the child seat 702 or removing a child therefrom). By enabling the child seat 702 to extend outward from the side of the vehicle, through the vehicle side 703, the caregiver is provided improved ease of access and use of the child seat 702.

Referring now to FIGS. 8A-8D, schematic illustrations of a child restraint system 800 in accordance with an embodiment of the present disclosure are shown. The child restraint system 800 may be similar to that shown and described above. The child restraint system 800 includes a child seat 802 mounted to a support base 804. The child seat 802 may be a convertible child seat, an infant child seat, or other seat or the like for providing a seat or space to secure a child within a vehicle. The support base 804 of the child restraint system 800 may be configured to securely attach to a vehicle seat or other vehicle structure.

Figure 8A:
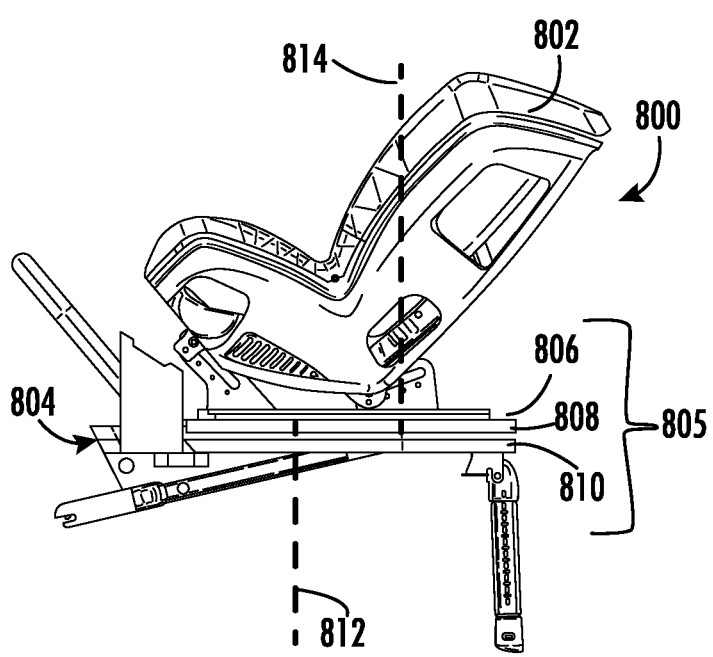
FIG. 8A is a schematic side view of a child restraint system in accordance with an embodiment of the present disclosure.
Figure 8B:
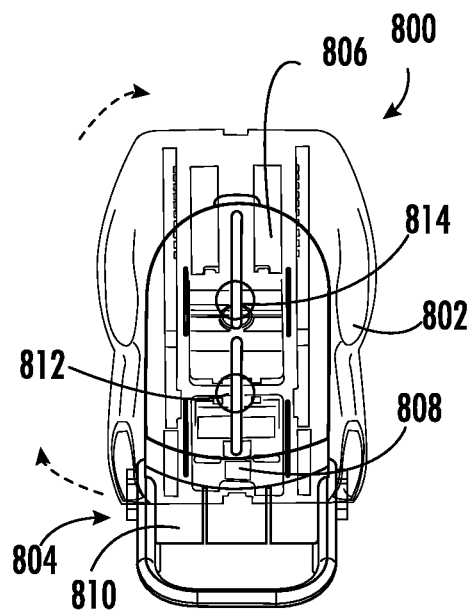
FIG. 8B is a top down view of the child restraint system of FIG. 8A, shown in a travel position.
Figure 8C:
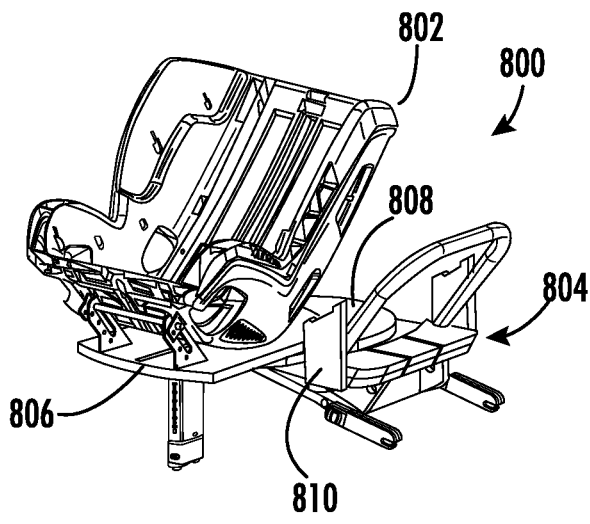
FIG. 8C is a perspective illustration of the child restraint system of FIG. 8A in a loading position.
Figure 8D:
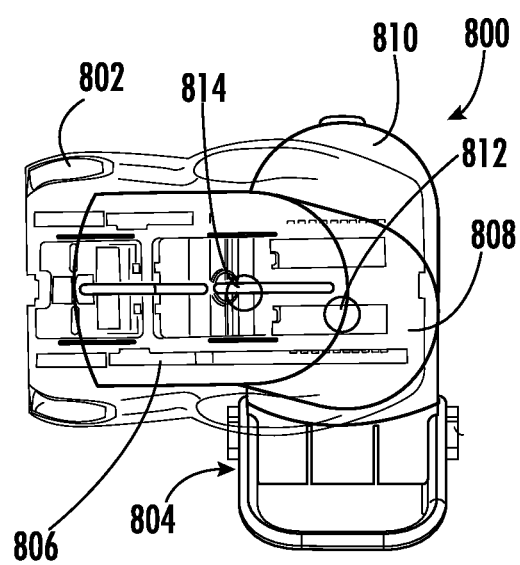
FIG. 8D is a top down view of the child restraint system of FIG. 8A, in the loading position.

The configuration of FIGS. 8A-8D is similar to that shown and described above. For example, as shown, the child restraint system 800 includes a support base 804 having a positioning assembly 805 having a first positioning element 806, a second positioning element 808, and a third positioning element 810. Although not labeled for clarity and simplicity, the child restraint system 800, and the support base 804 thereof, may include load legs, rebound bars, mounting brackets or the like (e.g., for tilting/reclining), and/or securing mechanisms. FIGS. 8A-8B illustrate the child restraint system 800 in a first position (e.g., a travel position) and FIGS. 8C-8D illustrate the child restraint system 800 in a second position (e.g., a loading position). In this configuration, the first positioning element 806 may be configured to slide relative to the second positioning element 808 and to support the child seat 802 such that when the first positioning element 806 moves, so does the child seat 802. The second positioning element 808 may be rotatable relative to the third positioning element 810, with the first positioning element 806 and the child seat 802 rotating with rotation of the second positioning element 808. The third positioning element 810 may be a fixed or stationary positioning element for supporting and securing the child restraint system 800 on and to a vehicle or vehicle seat.

As shown in FIGS. 8A-8B, the positioning assembly 805 includes or defines a first pivot axis 812 and a second pivot axis 814. The first pivot axis 812 is defined between or by the interaction between the third positioning element 810 and the second positioning element 808 and the second pivot axis 814 is defined between or by the interaction between the second positioning element 808 and the first positioning element 806. The first pivot axis 812, in this configuration, defines a rotational axis or pivot point about which the second positioning element 808 may be rotated relative to the third positioning element 810. The second pivot axis 814, in this configuration, defines a rotational axis or pivot point about which the first positioning element 806 may be rotated relative to the second positioning element 808. As such, the orientation of the first positioning element 806 and the second positioning element 808 (as shown in FIG. 8B) may be rotated as a single unit or structure relative to the third positioning element 810 about the first pivot axis 812. As a second operation or simultaneously, the first positioning element 806 may be rotated relative to the second positioning element 808 about the second pivot axis 814. Once in the second position (FIG. 8D), the child seat 802 may be slidingly moved or translated relative to the first positioning element 806.

Figure 9C:
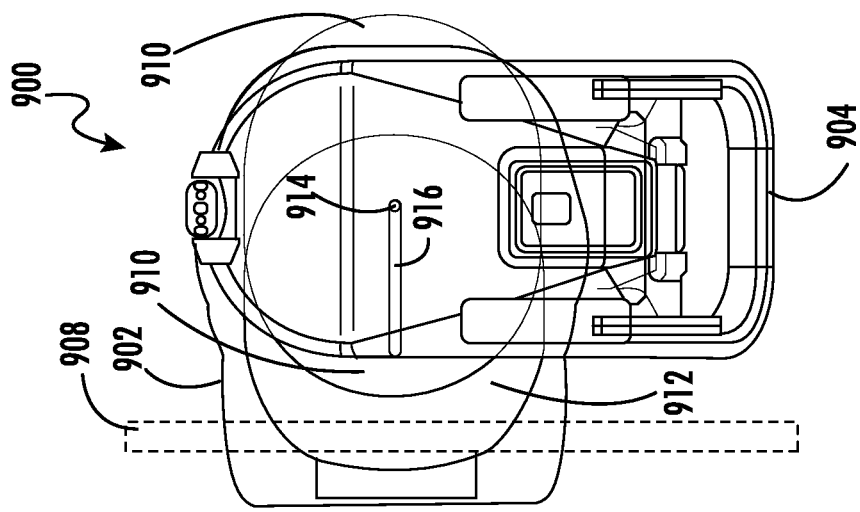
FIG. 9C is a bottom up view of the system of FIG. 9A shown in a rotated and translated position.
Figure 9B:
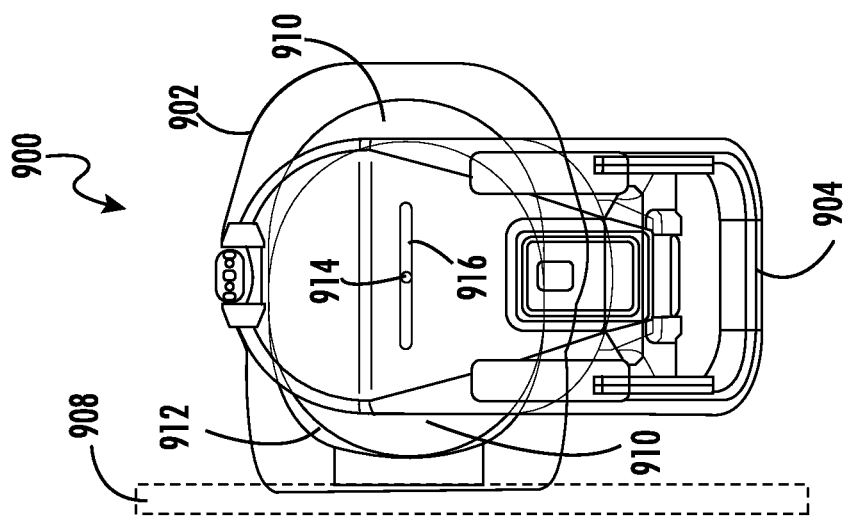
FIG. 9B is a bottom up view of the system of FIG. 9A shown in a rotated position.
Figure 9A:
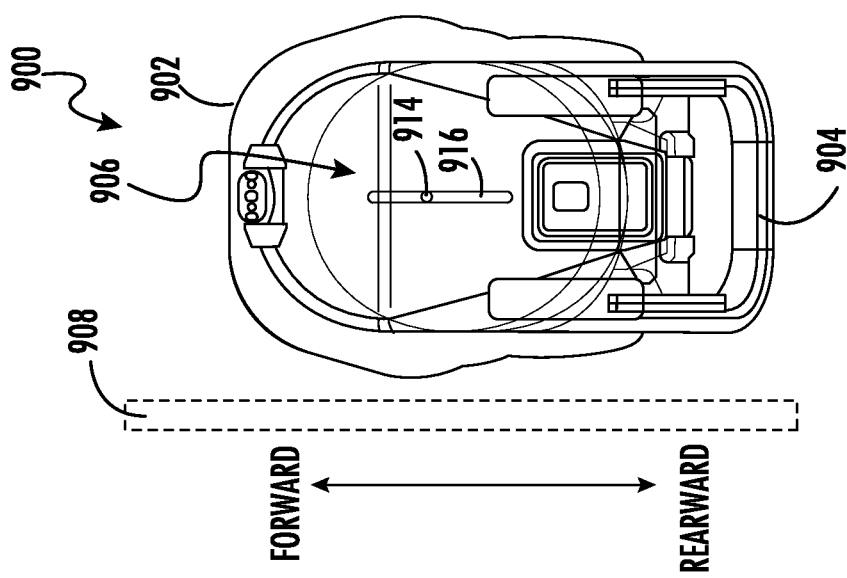
FIG. 9A is a bottom up view of a child restraint system shown in a travel position and relative to a vehicle side.

Referring now to FIGS. 9A-9C, schematic illustrations of a use of a child restraint system 900 in accordance with an embodiment of the present disclosure are shown. The child restraint system 900 may be similar to configurations shown and described above. In these illustrative embodiments, FIGS. 9A-9C represent bottom views (e.g., viewed upward from a vehicle seat upon which the child restraint system 900 is installed). The child restraint system 900 includes a child seat 902 supported on a support base 904 that includes a positioning assembly 906 for enabling adjustment of a position and orientation of the child seat 902 relative to a vehicle side 908. The vehicle side 908 may represent an open door of a vehicle, allowing for access to and for loading or unloading a child from the child seat 902. The positioning assembly 906 includes, in this illustrative configuration, a first positioning element 910 and a second positioning element 912. The first positioning element 910 may be a rotating element that is rotatable about a pivot 914, and the second positioning element 912 includes a track 916 that enables the second positioning element 912 to slide relative to the first positioning element 910. The second positioning element 912 is rotationally coupled to the first positioning element 910 such that when the first positioning element 910 is rotated (e.g., by manual turning of the child seat 902), the second positioning element 912 will also rotate.

FIG. 9A illustrates a travel position, with the track 916 arranged in a forward-rearward direction. By rotating the child seat 902 or the first positioning element 910, the child seat 902 may be rotated to face the vehicle side 908, as shown in FIG. 9B. As shown in FIG. 9B, the child seat 902 is now closer to the vehicle side 908 than when in the travel position (FIG. 9A). However, as shown in FIG. 9C, the child seat 902 may be slid outward toward (or through) the vehicle side 908, further improving access and use of the child seat 902. As shown in FIG. 9C, the second positioning element 912 is extended in the direction of the vehicle side 908, which carries the child seat 902 to also extend in the direction of the vehicle side 908.

Referring now to FIGS. 10A-10C, schematic illustrations of a positioning assembly 1000 in accordance with an embodiment of the present disclosure are shown. FIG. 10A illustrates an isometric view of the positioning assembly 1000, FIG. 10B illustrates the positioning assembly 1000 in a first position or orientation (e.g., travel position), and FIG. 10C illustrates the positioning assembly 1000 in a second position or orientation (e.g., loading position). The components of the positioning assembly 1000 may be used with a child seat and/or child restraint system, as described herein or in use with other types of child seats and/or configurations thereof.

The positioning assembly 1000, as illustrated, includes a stationary positioning element 1002 and a rotating positioning element 1004. In a non-limiting example, the stationary positioning element 1002 may be equivalent to the third positioning element described above and the rotating positioning element 1004 may be equivalent to the second positioning element described above. In this illustrative configuration, a sliding or translating positioning element (e.g., first positioning element described above) is omitted, but such sliding or translating layer may be configured to attach to a top surface of the rotating positioning element 1004 and may be arranged in sliding or translating relationship therewith. The stationary positioning element 1002 may be configured to sit upon a vehicle seat, when installed in a vehicle, and is arranged in fixed relationship therewith. Although not illustrated, the first and second positioning elements 1002, 1004 may be configured to include or have installed thereon, and without limitation, load legs, rebound bars, mounting brackets, recline structures, and the like, and may be part of a support base for a child restraint system, as described herein.

In this configuration, the stationary positioning element 1002 includes two first tracks 1006a, 1006b and the rotating positioning element 1004 includes two second tracks 1008a, 1008b. Although shown with two tracks each, in other embodiments, a single track may be employed and in other configurations, more than two tracks may be employed. In the illustrative configuration of FIGS. 10A-10C, a first pair of tracks 1006a, 1008a may be arranged or aligned such that a first post 1010a passes through each of the first track 1006a and the second track 1008a. Similarly, a second pair of tracks 1006b, 1008b may be arranged or aligned such that a second post 1010b passes through each of the first track 1006b and the second track 1008b. In some embodiments, the posts 1010a, 1010b may be part of the stationary positioning element 1002, although they are not fixed within or to the stationary positioning element 1002, allowing for movement of the posts 1010a, 1010b along each of the pairs of tracks 1006a, 1008a, 1006b, 1008b. In other embodiments, the posts 1010a, 1010b may be part of a sliding or translating layer (e.g., first positioning element described above), so long as a sliding/translating track or the like is provided to allow such sliding or translating layer to move relative to the rotating positioning element 1004.

Figure 11D:
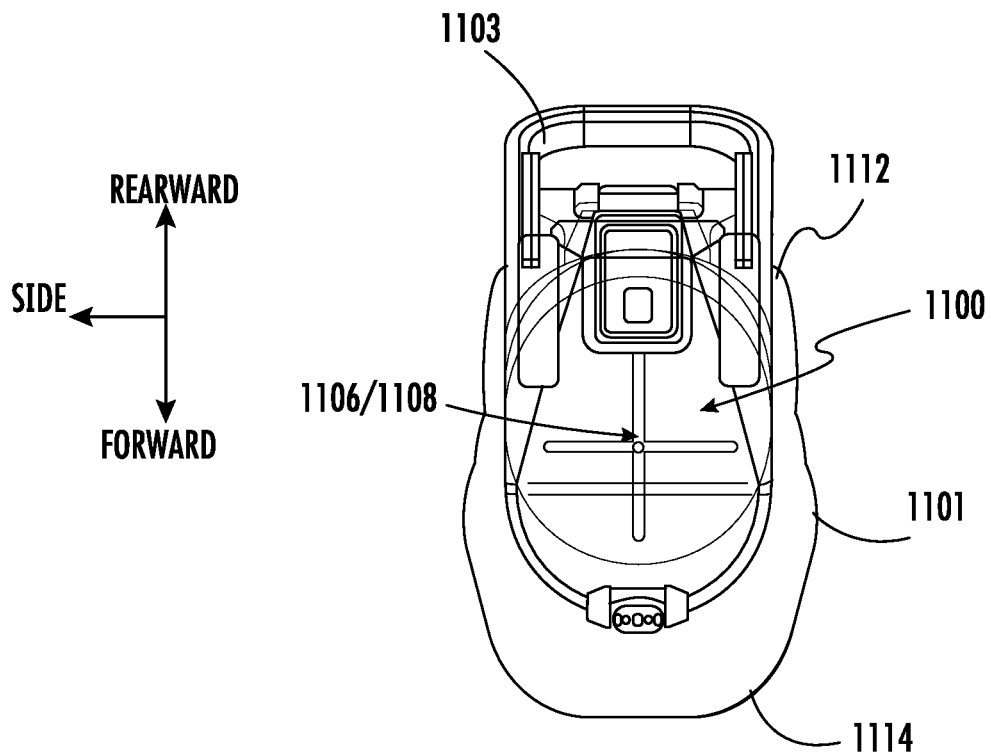
FIG. 11D illustrates a bottom up view of a child restraint system having the positioning assembly of FIGS. 11A-11C, shown in a travel position.
Figure 11E:
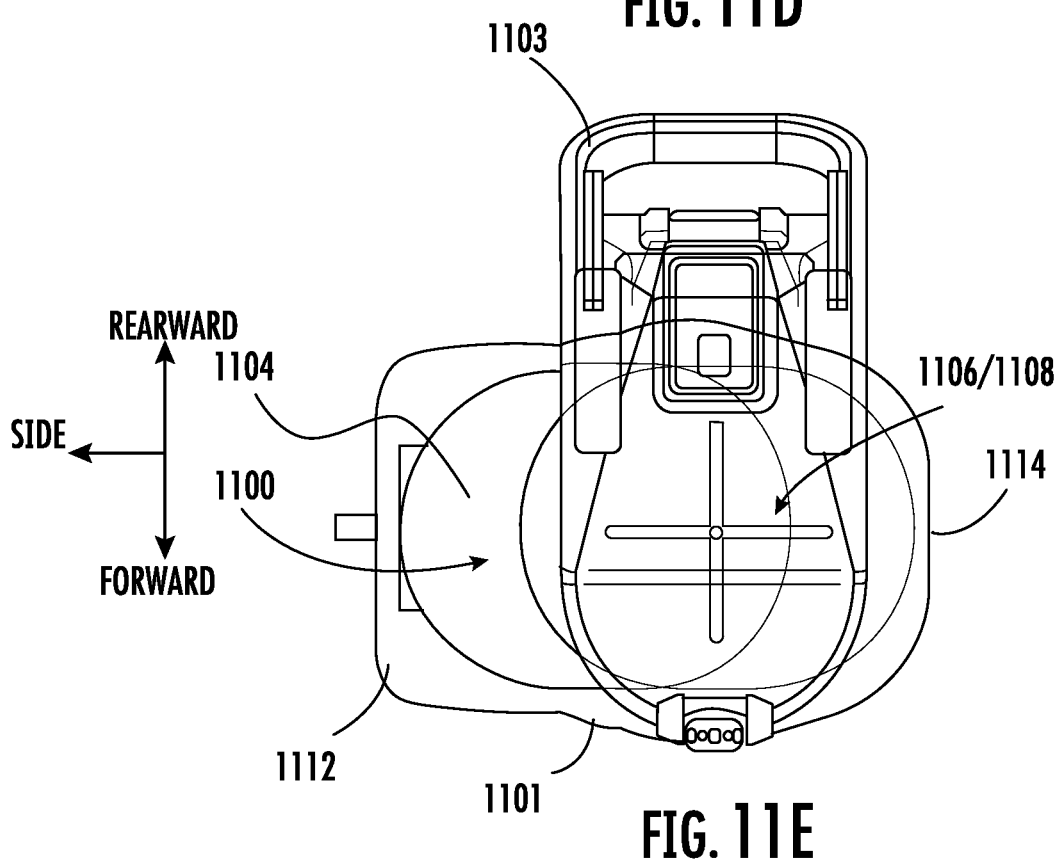
FIG. 11E illustrates a bottom up view of a child restraint system having the positioning assembly of FIGS. 11A-11C, shown in a loading position.

Referring now to FIGS. 11A-11E, schematic illustrations of a positioning assembly 1100 and operation with a child seat 1101 are shown. FIG. 11A illustrates an isometric view of the positioning assembly 1100, FIG. 11B illustrates the positioning assembly 1100 in a first position or orientation (e.g., travel position), and FIG. 11C illustrates the positioning assembly 1100 in a second position or orientation (e.g., loading position). FIGS. 11D-11E illustrate the child seat 1101 as supported on a support base 1103 with the positioning assembly 1100 arranged between the child seat 1101 and the support base 1103, and orientations thereof.

The positioning assembly 1100, as illustrated, includes a stationary positioning element 1102 and a rotating positioning element 1104. In a non-limiting example, the stationary positioning element 1102 may be equivalent to the third positioning element described above and the rotating positioning element 1104 may be equivalent to the second positioning element described above. In this illustrative configuration, a sliding or translating layer (e.g., first positioning element described above) is omitted, but such sliding or translating layer may be configured to attach to a top surface of the rotating positioning element 1104 may be arranged in sliding or translating relationship therewith. The stationary positioning element 1102 may be configured to sit upon a vehicle seat, when installed in a vehicle, and is arranged in fixed relationship therewith.

In this configuration, the stationary positioning element 1102 and the rotating positioning element 1104 include overlapping or aligned tracks 1106, 1108. The tracks 1106, 1108 are arranged as a "cross" or "T" shape that permits one or more posts 1110a, 1110b to move along the tracks 1106, 1108 or the tracks 1106, 1108 move along the posts 1110a, 1110b. The result is a relative motion that is provided between the stationary positioning element 1102 and the rotating positioning element 1104. The change in orientation of the positioning elements 1102, 1104 and the change in relative position of the posts 1110a, 1110b illustrate the change from a first position or orientation (e.g., travel position) to a second position or orientation (e.g., loading position). It will be appreciated that another positioning element may be movingly coupled to the rotating positioning element 1104 to provide a sliding movement (e.g., for a child seat 1101 attached to the support base 1103).

During rotation of the positioning assembly 1100, the rotating positioning element 1104 rotates about a pivot axis that extends through the post 1110a. The position of the pivot axis translates along the track 1108, such that after the positioning assembly 1100 rotates from a first rotation position (FIG. 11B) to a second rotation position (FIG. 11C), the pivot axis of the positioning assembly 1100 in the second rotation position is spaced from the pivot axis of the positioning assembly 1100 in the first rotation position.

As shown in FIGS. 11D-11E, the child seat 1101 may be rotated in orientation to a vehicle arrangement (e.g., rearward and side) by operation and use of the positioning assembly 1100. In FIG. 11D, the child seat 1101 is oriented in a travel position. In the travel position, a foot 1112 of the child seat 1101 is pointed toward the rear of the vehicle or in a rearward direction, and a head 1114 of the child seat 1101 is pointed toward the front of the vehicle or in a forward direction. By operation of the positioning assembly 1100, the child seat 1101 may be rotated and extended out to a side direction of the vehicle. For example, as shown in FIG. 11E, the head 1114 and foot 1112 of the child seat 1101 are oriented toward the side, and normal to the forward-rearward direction.

Figure 12D:
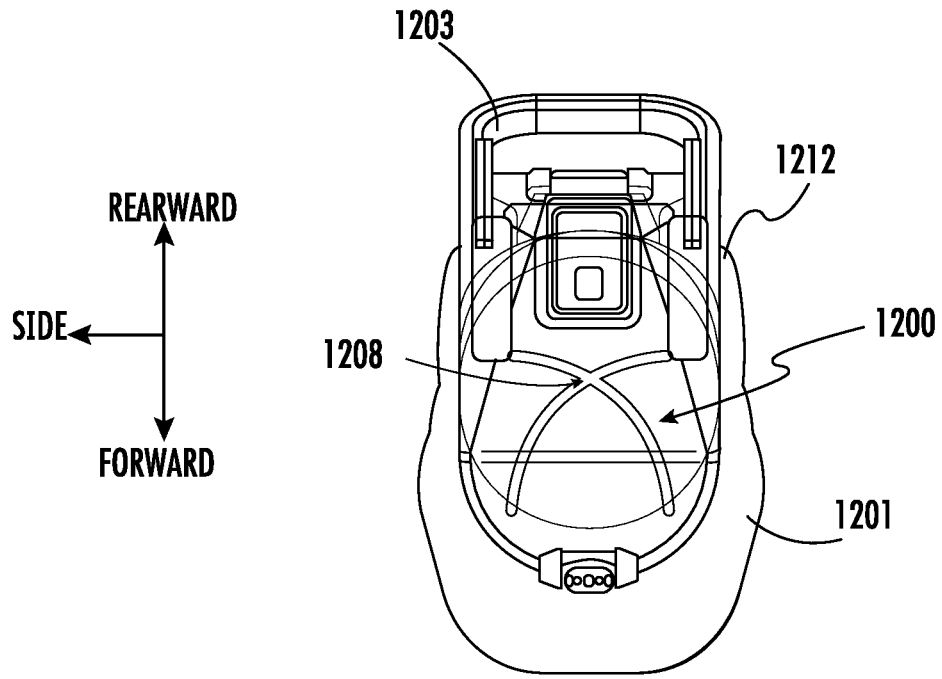
FIG. 12D illustrates a bottom up view of a child restraint system having the positioning assembly of FIGS. 12A-12C, shown in a travel position.
Figure 12E:
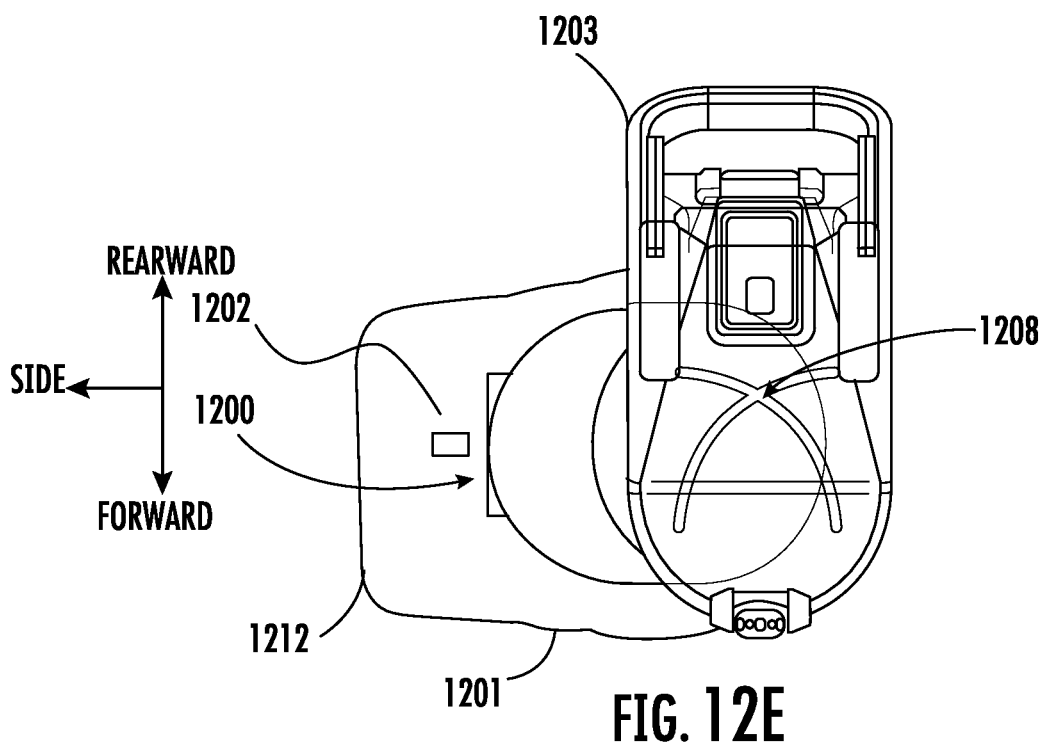
FIG. 12E illustrates a bottom up view of a child restraint system having the positioning assembly of FIGS. 12A-12C, shown in a loading position.

Referring now to FIGS. 12A-12E, schematic illustrations of a positioning assembly 1200 and operation with a child seat 1201 are shown are shown. FIG. 12A illustrates an isometric view of the support base 1203, FIG. 12B illustrates the positioning assembly 1200 in a first position or orientation (e.g., travel position), and FIG. 12C illustrates the positioning assembly 1200 in a second position or orientation (e.g., loading position). FIGS. 12D-12E illustrate the child seat 1201 as supported on a support base 1203 with the positioning assembly 1100 arranged between the child seat 1201 and the support base 1203, and orientations thereof.

The positioning assembly 1100, as illustrated, includes a stationary positioning element 1202 and a rotating positioning element 1204. In a non-limiting example, the stationary positioning element 1202 may be equivalent to the third positioning element described above and the rotating positioning element 1204 may be equivalent to the second positioning element described above. In this illustrative configuration, a sliding or translating layer (e.g., first positioning element described above) is omitted, but such sliding or translating layer may be configured to attach to a top surface of the rotating positioning element 1204 may be arranged in sliding or translating relationship therewith. The stationary positioning element 1202 may be configured to sit upon a vehicle seat, when installed in a vehicle, and is arranged in fixed relationship therewith.

In this configuration, the stationary positioning element 1202 includes one or more posts 1206a, 1206b and the rotating positioning element 1204 includes a track 1208. The track 1208 is arranged as arcuate crossing shape or channels that permit the posts 1206a, 1206b to move along the track 1208 or the track 1208 moves along the posts 1206a, 1206b, 1210b. The result is a relative motion that is provided between the stationary positioning element 1202 and the rotating positioning element 1204. The change in orientation of the positioning elements 1202, 1204 and the change in position of the posts 1206a, 1206b within the track 1208 illustrates the change from a first position or orientation (e.g., travel position) to a second position or orientation (e.g., loading position). It will be appreciated that another positioning element may be movingly coupled to the rotating positioning element 1204 to provide a sliding movement (e.g., for a child seat attached to the positioning assembly 1200).

As shown in FIGS. 12D-12E, the child seat 1201 may be rotated in orientation to a vehicle arrangement (e.g., rearward and side) by operation and use of the positioning assembly 1200. In FIG. 12D, the child seat 1201 is oriented in a travel position. In the travel position, a foot 1212 of the child seat 1201 pointed toward the rear of the vehicle or in a rearward direction, and a head of the child seat 1201 is pointed toward the front of the vehicle or in a forward direction. By operation of the positioning assembly 1200, the child seat 1201 may be rotated and extended out to a side direction of the vehicle. For example, as shown in FIG. 12E, the foot 1212 of the child seat 1201 may extend toward the side, and normal to the forward-rearward direction.

The positioning assemblies 1000, 1100, and 1200, shown and described above, may be configured to provide both rotation and translation simultaneously. For example, as the two illustrative positioning elements are moved relative to each other, the arrangement of the tracks and other features may be that as a rotation occurs, so does a translation, or as a translation occurs, so does a rotation. As shown in each of FIGS. 10C, 11C, and 12C, a portion of the positioning assemblies 1000, 1100, 1200 extends to a side and is rotated relative to the rearward-forward direction. In the configurations of positioning assemblies 1000, 1200, the tracks may be arranged such that the motion defined and enabled by the tracks is a curved motion which result in both a rotation and a translation.

Although illustrated with a post-and-track configuration, such a configuration is not intended to be limiting. The illustrated configurations provide for systems with minimal moving parts, thus improving the simplicity of the system. However, in accordance with some embodiments, additional components and mechanisms may be provided to assist in the movement of the various layers and/or moving the child seat between a travel position and a loading position. For example, in some configurations, a pulley system, a geared system, an arm-based system, pinion-and-gear system, pinion-and-track or rail, or the like may be employed rather than the post-and-track configurations.

As described above, the child seat of embodiments of the present disclosure is configured to be moveable relative to a support base. Multiple degrees of freedom or degrees of movement are provided by the support base of the child restraint systems described herein. The movement of the child seat relative to the support base (and provided by elements of the support base) enables the improved loading/unloading of a child from the child seat.

Figure 13B:
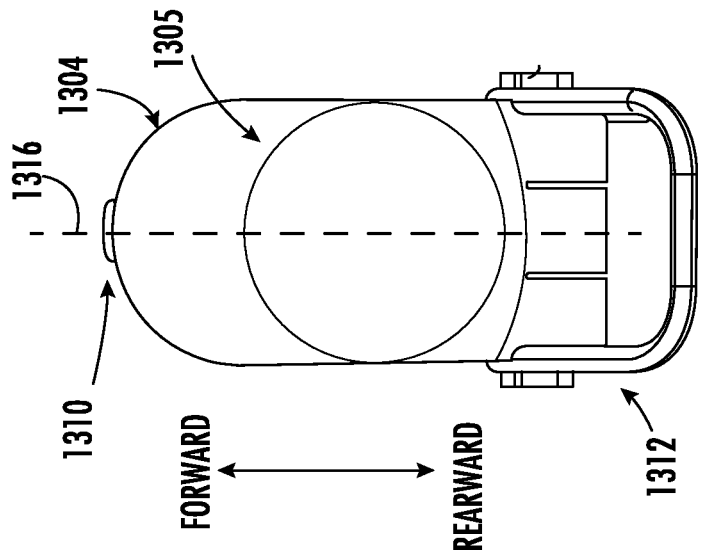
FIG. 13B illustrates a support base of a child restraint system in accordance with an embodiment of the present disclosure.
Figure 13A:
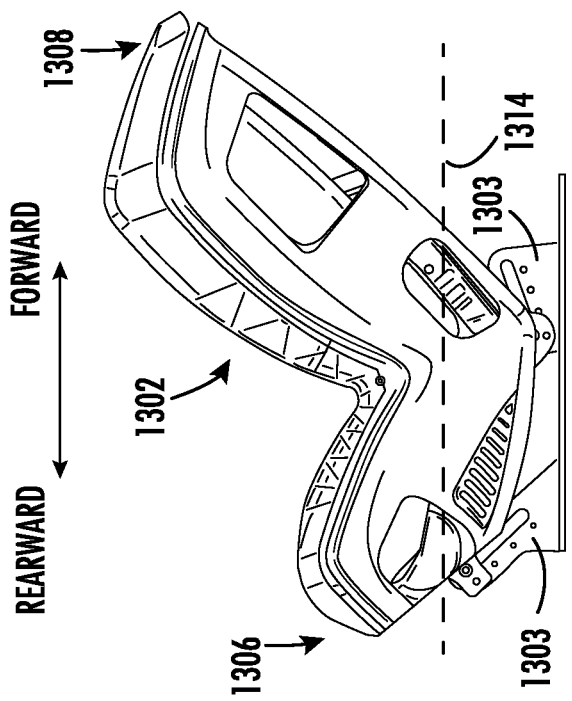
FIG. 13A illustrates a child seat of a child restraint system in accordance with an embodiment of the present disclosure.

Referring now to FIGS. 13A-13D, schematic illustrations of a child restraint system 1300 in accordance with an embodiment of the present disclosure are shown. The child restraint system 1300 includes a child seat 1302 that is attached to and movable relative to a support base 1304. FIG. 13A illustrates the child seat 1302 in isolation, with recline structures 1303 attached thereto. FIG. 13B illustrates the support base 1304 in isolation, including a positioning assembly 1305. FIG. 13C illustrates the child restraint system 1300 in a travel position, and FIG. 13D illustrates the child restraint system 1300 in a loading position. The child seat 1302 may be releasably attached, connected, or mounted to the support base 1304, or may be permanently affixed thereto, through the recline structures 1303 and/or positioning assembly 1305. In some embodiments, the child seat 1302 (or a portion thereof) may be completely removable from the support base 1304 such that the support base 1304 may remain in a vehicle and a caregiver may carry a child within the child seat 1302 or remove the child seat 1302 from the vehicle without removing the support base 1304 from the vehicle.

As shown in FIG. 13A, the child seat has a first end 1306 and a second end 1308 and the support base 1304 has a first end 1310 and a second end 1312. The first end 1306 of the child seat 1302 may be a foot or leg end of the seat (e.g., when a child is seated within the child seat 1302) and the second end 1308 may be a head end of the child seat 1302. In this illustrative embodiment, the child seat 1302 is a rearward-facing child seat, as indicated in FIG. 13B. The child seat 1302 defines a seat axis 1314 that extends in a forward-rearward direction when in the travel position (e.g., as shown in FIGS. 13B-13C), but is generally defined between the first end 1306 and the second end 1308.

As shown in FIG. 13B, the first end 1310 of the support base 1304 may be a forward end (e.g., aligned with a direction of motion of a vehicle) and the second end 1312 of the support base 1304 may be a rearward end thereof. As a result, the support base 1304 (having a stationary portion) may define a base axis 1316 between the first end 1310 and the second end 1312.

FIG. 13C illustrates the child restraint system 1300 in a first position (e.g., travel position). In the first position, the seat axis 1314 and the base axis 1316 are aligned or are parallel. As a result, the child restraint system 1300 has a relatively narrow profile, such as to fit on a vehicle seat. FIG. 13D illustrates the child restraint system 1300 in a second position (e.g., loading position). In the second position, the seat axis 1314 is rotated relative to the base axis. In some embodiments, the angle between the seat axis 1314 and the base axis 1316 may be adjusted between zero (where "zero"

is parallel or aligned, such as shown in FIG. 13C) and a full 360° of rotation. In other embodiments, the amount of relative rotation may be restricted, to be between zero and some angle less than 360°. For example, and as shown in FIG. 13D, in the second position, the seat axis 1314 may be rotated 90° relative to the base axis 1316. That is, in the second position, the seat axis 1314 may be normal to the base axis 1316.

In some embodiments in accordance with the present disclosure, the child seat 1302 may also be translated relative to the support base 1304. As such, in some embodiments, the child seat 1302 may be translatable or slidable along the seat axis 1314. In some configurations, the sliding motion may be restricted to only the loading position (FIG. 13D). In other configurations, the child seat 1302 may be slidable relative to the support base 1304 in any position, but particularly in the first position (FIG. 13C) and the second position (FIG. 13D).

The child seat 1302 includes or defines a seating area 1318 upon which a child may sit and be held on the child seat 1302. The seat axis 1314 passes through the seating area 1318 and defines a general orientation of the facing of a child seated in the child seat 1302. As shown in FIG. 13C, the seating area 1318 is generally axially aligned with the base axis 1316 (i.e., seat axis 1314 and base axis 1316 are parallel). When the child seat 1302 is rotated from the first position (FIG. 13C, e.g., a travel position) to the second position (FIG. 13D, e.g., a loading position), the seating area 1318 is rotated off of the base axis 1316. In this position, the seating area 1318 will be located closer to a vehicle door (or extend out form a vehicle door) as compared to the travel position. As shown in FIGS. 13C-13D, the support base 1304 defines the base axis 1316 that extends from a rear end (e.g., end 1312) of the support base 1304 to a front end (e.g., end 1310) of the support base 1304. The positioning assembly 1305 is configured such that in a first rotation position (e.g., FIG. 13C), a center of gravity of the child seat (e.g., center of the seating area 1318) intersects the base axis 1316, and in a second rotation position the center of gravity of the child seat (e.g., center of the seating area 1318) is offset from the base axis 1316. Further, during rotation of the positioning assembly 1305 from the first rotation position to the second rotation position, the front end of the child seat (e.g., end 1306) moves along a partial elliptical path.

In accordance with some embodiments, and as schematically shown in FIG. 13D, the child restraint system 1300 may include one or more locking mechanisms 1320. The locking mechanisms 1320 may be actuatable or operable elements that can selectively secure one or more elements of the child restraint system 1300 together. For example, detent-type locking mechanism may be arranged between the positioning elements of the positioning assembly 1305 to selectively secure relative movement. That is, in a locked state, one or more of the positioning elements may be fixed together and thus move (or not move) together. When operation or movement of the child seat 1302 is desired, one or more of the locking mechanisms 1320 may be unlocked to allow for relative movement, such as shown and described herein. As such, for example, when the child seat 1302 is moved to the loading position (FIG. 13D), the locking mechanisms 1320 may be used to lock the position of the child seat 1302 relative to the support base 1304 such that the child seat 1302 does not slide or rotate during loading a child into or removing a child from the child seat 1302. The locking mechanisms 1320 may be detents, spring locks, snaps, cotter pins, lockable gears or tracks (e.g., for rotation or translation), or the like. The locking mechanisms 1320 may be used for both securing or locking the position of the child seat 1302 relative to the support base 1304 (e.g., in either or both the travel position and the loading position). In some non-limiting embodiments, the locking mechanisms 1320 may be always in a locked state except for when acted upon by a user (e.g., caregiver), such that the default state is to lock the position of the child seat 1302 relative to the support base 1304, except when the locking mechanism 1320 is operated. In some non-limiting embodiments, the opposite may be true, wherein the locking mechanisms are in an unlocked state except when a used by a caregiver to secure the position of the child seat 1302 relative to the support base 1304.

Advantageously, embodiments of the present disclosure provide for improved child seats and/or child restraint systems for use in vehicles. The child restraint systems include a child seat that is movably mounted to a support base. The support base can provide multiple degrees of freedom or movement, including, but not limited to rotating and sliding. The multiple degrees of movement may be provided by a multi-layer support base. As such, a child seat may be rotated and moved, even when the support base is fixedly attached to a vehicle (or vehicle seat). As such, improved use and ease of use are provided for caregivers when putting a child into the child seat or removing the child from the child seat. In accordance with some embodiments of the present disclosure, a support base of a child restraint system may include multiple layers that are moveable relative to each other. The layers can provide both rotational movement and translational movement to provide a greater range of motion as compared to conventional child restraint systems.

The term "about" is intended to include the degree of error associated with measurement of the particular quantity based upon the equipment available at the time of filing the application. As used herein, the term "substantially" and derivatives thereof, and words of similar import, when used to describe a size, shape, orientation, distance, spatial relationship, or other parameter includes the stated size, shape, orientation, distance, spatial relationship, or other parameter, and can also include a range up to 10% more and up to 10% less than the stated parameter, including 5% more and 5% less, including 3% more and 3% less, including 1% more and 1% less.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A child restraint system comprising for use in a vehicle, the child restraint system comprising:
a support base removably mountable to a vehicle seat of the vehicle, the support base being positionable on top of an upper seat surface of the vehicle seat, the support base comprising:
a first positioning element couplable to a child seat of the child restraint system, the child seat having a seat axis extending between a front and a rear of the child seat;
a second positioning element, wherein the first positioning element is moveably connected to the second positioning element in a translating manner; and
a third positioning element, wherein the second positioning element is movably connected to the third positioning element in a rotating manner;
wherein the first positioning element is translatable relative to the third positioning element along the seat axis.

2. The child restraint system of claim 1, wherein the second positioning element is arranged between the first positioning element and the third positioning element.

3. The child restraint system of claim 1, further comprising a securing mechanism operably coupled to the third positioning element on a side opposite the second positioning element.

4. The child restraint system of claim 1, further comprising a load leg operably coupled to the third positioning element on a side opposite the second positioning element.

5. The child restraint system of claim 1, further comprising at least one locking mechanism configured releasably fix a relative movement between at least two of the first positioning element, the second positioning element, and the third positioning element.

6. The child restraint system of claim 1, wherein the first positioning element is configured to slide outwardly from a side of the third positioning element.

7. The child restraint system of claim 1, wherein the second positioning element is configured to rotate relative to the third positioning element, wherein when the second positioning element is rotated relative to the third positioning element, the first positioning element is rotated with the second positioning element.

8. The child restraint system of claim 1, wherein the first positioning element is configured to have a sliding direction that changes based on the orientation of the second positioning element.

9. The child restraint system of claim 1, wherein the third positioning element is a stationary positioning element.

10. The child restraint system of claim 1, wherein the third positioning element defines at least one track upon which the second positioning element rotates.

11. The child restraint system of claim 1, wherein at least one of the second positioning element and the third positioning element defines at least one track upon which the first positioning element slides.

12. The child restraint system of claim 1, wherein the third positioning element is integrally part of the support base.

13. A child restraint system for use in a vehicle, the child restraint system comprising:
a child seat; and
a support base removably mountable to a vehicle seat of the vehicle and configured to support the child seat thereon, the support base being positionable on top of an upper seat surface of the vehicle seat, the support base comprising:
a first positioning element configured to couple to the child seat, the child seat having a seat axis extending between a front and a rear of the child seat;
a second positioning element, wherein the first positioning element is moveably connected to the second positioning element in a translating manner; and
a third positioning element, wherein the second positioning element is movably connected to the third positioning element in a rotating manner;
wherein the first positioning element is translatable relative to the third positioning element along the seat axis.

14. The child restraint system of claim 13, wherein the first positioning element is configured to slide relative to the second positioning element, with the child seat sliding with the sliding of the first positioning element.

15. The child restraint system of claim 13, wherein the second positioning element is configured to rotate relative to the third positioning element, with the first positioning element and the child seat rotating with rotation of the second positioning element.

16. The child restraint system of claim 15, wherein when the first positioning element and the second positioning element are rotated relative to the third positioning element, the child seat is rotated relative to a travel position and toward a loading position.

17. The child restraint system of claim 16, wherein the child seat having a seat axis generally defined between a leg end of the child seat and a head end of the child seat, and the support base having a base axis generally defined between a forward end of the support base and a rearward end of the support base, and wherein the seat axis and the base axis are parallel in the travel position, and the seat axis and the base axis are non-parallel in the loading position.

18. The child restraint system of claim 16, wherein the child seat extends outward to a side of the third positioning element when in the loading position.

19. The child restraint system of claim 13, wherein the first positioning element is configured to provide a sliding movement of the child seat relative to both the second positioning element and the third positioning element.

20. The child restraint system of claim 19, wherein the sliding movement is provided when the child seat is in at least one of a right side facing orientation and a left side facing orientation.

* * * * *

UNITED STATES PATENT AND TRADEMARK OFFICE
CERTIFICATE OF CORRECTION

PATENT NO. : 12,508,960 B2  
APPLICATION NO. : 18/463838  
DATED : December 30, 2025  
INVENTOR(S) : Curtis M. Hartenstine et al.

Page 1 of 1

It is certified that error appears in the above-identified patent and that said Letters Patent is hereby corrected as shown below:

In the Claims

Column 23, Line 6, Claim 1, delete "comprising".

Signed and Sealed this  
Third Day of February, 2026

John A. Squires  
*Director of the United States Patent and Trademark Office*